United States Patent
Sakaguchi et al.

(10) Patent No.: US 9,969,400 B2
(45) Date of Patent: May 15, 2018

(54) VEHICLE DRIVE SYSTEM

(71) Applicant: HONDA MOTOR CO., LTD., Tokyo (JP)

(72) Inventors: Yusuke Sakaguchi, Wako (JP); Satoshi Ando, Wako (JP); Masatoshi Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/474,021

(22) Filed: Mar. 30, 2017

(65) Prior Publication Data

US 2017/0282928 A1 Oct. 5, 2017

(30) Foreign Application Priority Data

Mar. 31, 2016 (JP) .................................. 2016-072180

(51) Int. Cl.

| | | |
|---|---|---|
| *B60W 30/18* | (2012.01) | |
| *B60K 17/348* | (2006.01) | |
| *B60K 28/16* | (2006.01) | |
| *B60W 30/188* | (2012.01) | |

(52) U.S. Cl.
CPC ..... *B60W 30/18172* (2013.01); *B60K 17/348* (2013.01); *B60K 28/16* (2013.01); *B60W 30/188* (2013.01); *B60W 2520/263* (2013.01)

(58) Field of Classification Search
CPC ......... B60W 30/045; B60W 30/18145; B60W 30/18172; B60W 2520/26; B60W 2520/263; B60W 2520/266; B60W 2720/403; B60K 28/16
See application file for complete search history.

(56) References Cited

U.S. PATENT DOCUMENTS

| | | | | |
|---|---|---|---|---|
| 2005/0103549 A1* | 5/2005 | Matsuda | ................... | B60K 6/44 180/243 |
| 2005/0278104 A1* | 12/2005 | Masuda | ................... | B60K 6/44 701/69 |
| 2014/0121870 A1* | 5/2014 | Lee | ........................ | B60W 20/14 701/22 |

FOREIGN PATENT DOCUMENTS

JP 2008-120119 A 5/2008

* cited by examiner

*Primary Examiner* — Edwin A Young
(74) *Attorney, Agent, or Firm* — Westerman, Hattori, Daniels & Adrian, LLP

(57) ABSTRACT

A vehicle drive system includes a slip acquisition unit that acquires that an excessive slip of front wheels or rear wheels has occurred, an addition slip point calculating unit that calculates addition slip points in a time-discrete manner, based on the slip acquisition unit having acquired that the excessive slip has occurred, a cumulative slip point calculating unit that accumulates the addition slip points and calculates a cumulative slip point over time, a drive state switching unit that, switches between 2WD and AWD based on cumulative slip points, and an increase forbidding determination unit that forbids addition or accumulation of the addition slip points, or increase of the cumulative slip points, in a case where a lateral acceleration correlation value that has correlation with lateral acceleration of the vehicle exceeds a lateral acceleration threshold value.

4 Claims, 17 Drawing Sheets

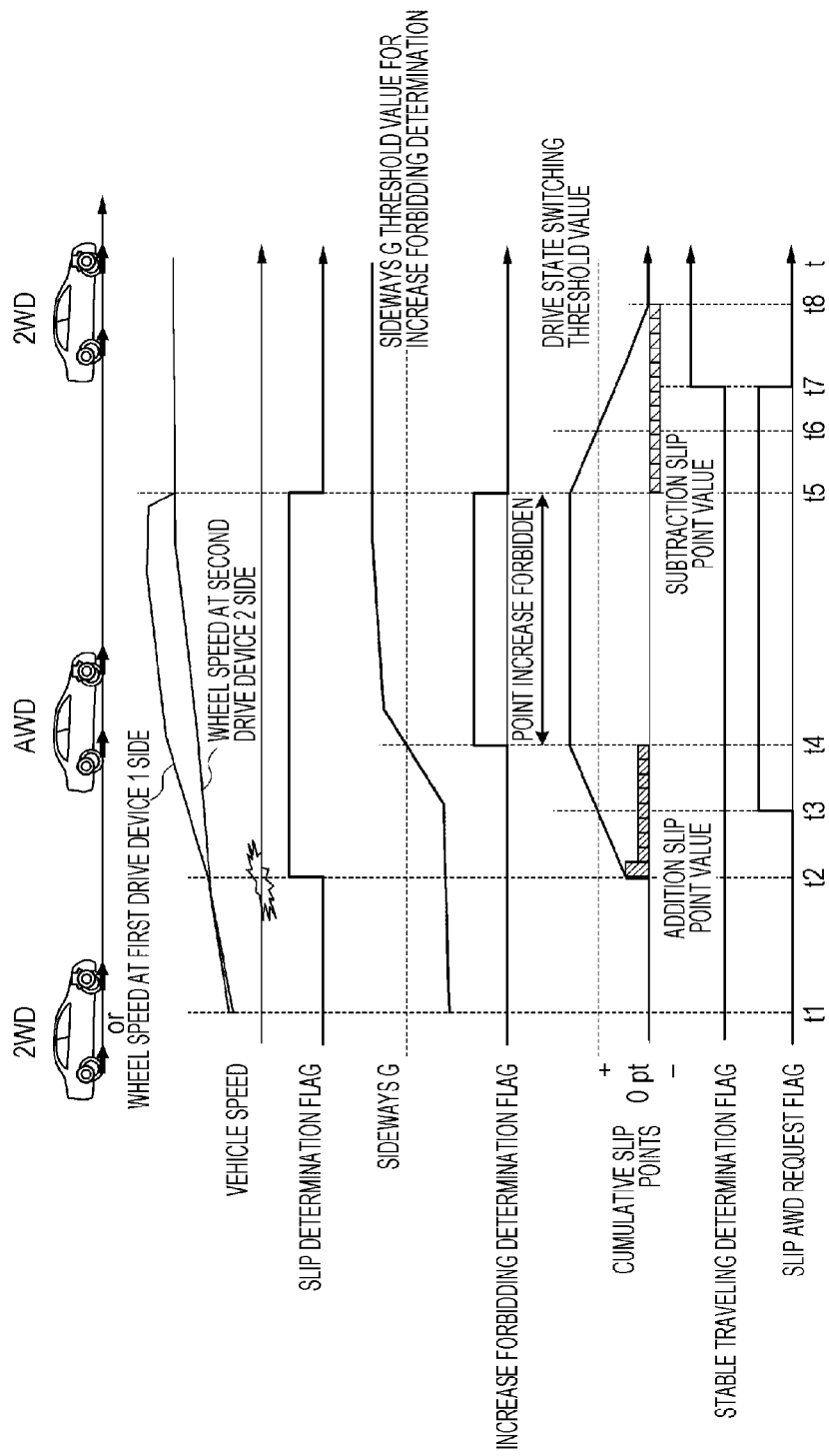

«VEHICLE DRIVE SYSTEM»

VEHICLE DRIVE SYSTEM

CROSS REFERENCES TO RELATED APPLICATIONS

The present application claims priority under 35 U.S.C. § 119 to Japanese Patent Application No. 2016-072180, filed Mar. 31, 2016, entitled "Vehicle Drive System." The contents of this application are incorporated herein by reference in their entirety.

BACKGROUND

1. Field

The present disclosure relates to a vehicle drive system, and more particularly relates to a vehicle drive system that switches the drive state of a vehicle when slipping is occurring.

2. Description of the Related Art

There has been conventionally proposed a technology where, when front wheels or rear wheels of a vehicle slips, a two-wheel drive state (hereinafter referred to as "2WD") is switched to a four-wheel drive state (hereinafter referred to as "AWD"), and AWD is continued while a preset four-wheel drive continuing time elapses from the point that the slipping state has been resolved (e.g., see Japanese Unexamined Patent Application Publication No. 2008-120119). This Japanese Unexamined Patent Application Publication No. 2008-120119 discloses technology where slipping is detected based on the wheel speed of front wheels and the wheel speed of rear wheels. More specifically, determination is made that slipping is occurring in a case where difference occurs in the wheel speed of front wheels and the wheel speed of rear wheels, due to the front wheel speed being faster rotations than the rear wheel speed. Further, Japanese Unexamined Patent Application Publication No. 2008-120119 discloses technology where, upon having detected slipping, the drive state is switched from two-wheel drive (2WD) to all-wheel drive (AWD), and AWD is continued until a predetermined four-wheel drive continuing time elapses.

Using technology such as the technology proposed in Japanese Unexamined Patent Application Publication No. 2008-120119 enables speedy switching to AWD in a case where difference occurs in the wheel speed of the front wheels and the wheel speed of the rear wheels. Now, there are cases where there is no need to switch to AWD even if difference does occur in the wheel speed of the front wheels and the wheel speed of the rear wheels. For example, in a case where the driver performs steering operations such that the steering angle suddenly changes on a road surface with a high friction coefficient (μ) such as a dry road or the like, difference will occur between the wheel speed of the front wheels and the wheel speed of the rear wheels. However, this is the result of intentional operations by the driver, and the vehicle is not in an inoperable state. Accordingly, even if there is difference in the wheel speed of the front wheels and the wheel speed of the rear wheels in such a case, there is not always a need to switch to AWD.

However, the technology such as that proposed in Japanese Unexamined Patent Application Publication No. 2008-120119 uniformly switches to AWD if difference occurs between the wheel speed of the front wheels and the wheel speed of the rear wheels. Accordingly, switching from 2WD to AWD regardless of a situation where the friction coefficient of the road surface is high and AWD is needless, may result in poor fuel consumption or electricity consumption (hereinafter referred to as "drive efficiency"). Also, consecutively detecting slipping even after having switched to AWD results in needlessly continuing AWD for extended periods of time regardless of a situation where the friction coefficient of the road surface is high and AWD is needless, may also result in poor drive efficiency.

On the other hand, in a case where slipping is occurring on a road surface in a low friction coefficient state, such as in wet or frozen road conditions, vehicle stability cannot be secured unless switching to AWD, so not switching to AWD at all is not an option.

It has been found to be desirable to provide a vehicle drive system that can improve drive efficiency while securing vehicle stability, by appropriately deciding whether or not to switch between drive states of the vehicle.

SUMMARY

The present application describes a vehicle drive system (e.g., a later-described vehicle drive system) including a first drive device (e.g., later-described first drive device) that drives first drive wheels that are one of front wheels (e.g., later-described front wheels) and rear wheels (e.g., later described rear wheels) of a vehicle (e.g., later-described vehicle), a second drive device (e.g., later-described second drive device) that drives second drive wheels that are the other of front wheels and rear wheels of the vehicle, and a control device (e.g., later-described ECU) that controls the first drive device and the second drive device, and controls a drive state of the first drive wheels and the second drive wheels. Hereinafter, as an exemplary embodiment for an in part-wheel drive state, a case of 2WD where a front-two or rear-two wheel drive state is explained, although there is no intention to limit the invention to the case of 2WD.

The control device of the vehicle drive system according to the present disclosure includes a slip acquisition unit (e.g., later-described slip acquisition unit) that acquires that an excessive slip, which is slipping of the first drive wheels or the second drive wheels by a predetermined amount or more, is occurring, an addition slip point calculating unit (e.g., later-described addition slip point calculating unit) that calculates addition slip points in a time-discrete manner, based on the slip acquisition unit having acquired that the excessive slip has occurred, a cumulative slip point calculating unit (e.g., later-described cumulative slip point calculating unit) that accumulates the addition slip points and calculates a cumulative slip point over time, a drive state switching unit (e.g., later-described drive state switching unit) that, in a case where the cumulative slip point is smaller than a drive state switching threshold value, realizes a two-wheel drive state (2WD) where the vehicle is driven by only one of the first drive wheels and the second drive wheels, and in a case where the cumulative slip point is equal to or greater than the drive state switching threshold value, realizes an all-wheel drive state (AWD) where the vehicle is driven by both the first drive wheels and the second drive wheels, and an increase forbidding determination unit (e.g., later-described increase forbidding determination unit) that forbids addition or accumulation of the addition slip points, or increase of the cumulative slip points, in a case where a lateral acceleration correlation value (e.g., lateral Gs acting upon the vehicle) that has correlation with lateral acceleration of the vehicle exceeds a lateral acceleration threshold value (e.g., a lateral G threshold value in later-described increase forbidding determination).

According to the present disclosure, addition slip points are calculated in a time-discrete manner, based on the slip acquisition unit having acquired that excessive slipping has occurred. Switching is performed between 2WD and AWD based on cumulative slip points that are the accumulated value of the calculated addition slip points.

In a case of performing such switching in the present disclosure, addition or accumulation of the addition slip points, or increase of the cumulative slip points, is forbidden, or not forbidden and permitted, based on the lateral acceleration correlation value that has correlation with lateral acceleration of the vehicle.

With regard to this point, if lateral acceleration correlation values of lateral Gs or the like are high, there is a high likelihood that the road has a high friction coefficient, such as the road being paved, the road surface being dry, and so forth. In such a case for example, if the driver performs steering operations such that the steering angle suddenly changes on a road surface with a high friction coefficient such as a dry road or the like, difference will occur between the wheel speed of the front wheels and the wheel speed of the rear wheels. However, this is the result of intentional operations by the driver, and the vehicle is not in an inoperable state. Accordingly, even if there is difference in the wheel speed of the front wheels and the wheel speed of the rear wheels in such a case, there is not always a need to switch to AWD. In such a case, addition or accumulation of the addition slip points, or increase of the cumulative slip points, is forbidden in the present disclosure. This prevents a vehicle traveling in 2WD from switching from 2WD to AWD. Accordingly, switching to AWD even though the road surface has a high friction coefficient and AWD is unnecessary can be prevented, thereby improving drive efficiency.

On the other hand, if lateral acceleration correlation values such as lateral Gs or drive force correlation values such as four-wheel drive force are low, there is a high likelihood that slipping is occurring with road conditions of low friction coefficient such as wet pavement, frozen conditions, or the like. Accordingly, in such a case, addition or accumulation of the addition slip points, or increase of the cumulative slip points, is not forbidden in the present disclosure, so the drive state can be switched from 2WD to AWD in accordance with the drive force of a drive wheel where slipping has occurred, so vehicle stability can be secured in a case where the road surface has a low friction coefficient and AWD is necessary.

Also, even in a case where the drive state already is AWD, addition or accumulation of the addition slip points, or increase of the cumulative slip points, is forbidden if lateral acceleration correlation values having correlation with the lateral acceleration of the vehicle have exceeded the lateral acceleration threshold value. Otherwise, accumulation of addition slip points would continue to where the cumulative slip points reach an excessively great value. Accordingly, in the present disclosure, addition or accumulation of the addition slip points, or increase of the cumulative slip points, is forbidden even in a case where the drive state already is AWD, so that cumulative slip points can be prevented from being excessively accumulated, and the drive state can be promptly switched from AWD to 2WD after slipping ends. Accordingly, in the present disclosure, a situation where AWD is needlessly continued for a long time even though the friction coefficient of the road is high and AWD is unnecessary, can be suppressed, even further improving drive efficiency.

Also, in the present disclosure, even if the vehicle is traveling in AWD, addition or accumulation of the addition slip points, or increase of the cumulative slip points, is executed at the point that determination is made to permit and not forbid addition or accumulation of the addition slip points, or increase of the cumulative slip points. Thus, by permitting addition or accumulation of the addition slip points, or increase of the cumulative slip points even if the drive state has already been switched to AWD, cumulative slip points continue to be accumulated, so the drive state is not immediately switched from AWD to 2WD after the slipping has ended. Accordingly, in the present disclosure, in a case of slipping on a road surface in a low friction coefficient state, such as in wet or frozen road conditions, traveling in AWD is continued, thereby enabling vehicle stability to be secured.

In this case, the control device preferably executes the increase forbidding determination unit in a case where the lateral acceleration correlation value exceeds the lateral acceleration threshold value in a two-wheel drive state.

In a case where the drive state is 2WD, addition or accumulation of the addition slip points, or increase of the cumulative slip points, is forbidden in the present disclosure if lateral acceleration correlation values having correlation with the lateral acceleration of the vehicle have exceeded the lateral acceleration threshold value. Thus, the vehicle traveling in 2WD can be suppressed from switching from 2WD to AWD, and the above-described advantages can be had in a more sure manner.

In this case, the control unit preferably further includes a determining unit that, in a case where the cumulative slip point is smaller than the drive state switching threshold value in the all-wheel drive state, determines whether or not conditions for the drive state switching unit to realize the two-wheel drive state have been satisfied, and in a case where the cumulative slip point is smaller than the drive state switching threshold value and also the conditions to realize the two-wheel drive state have been satisfied, the drive state switching unit preferably realizes the two-wheel drive state.

According to the present disclosure, even if the cumulative slip points are smaller than the drive state switching threshold value, the drive state is not switched to 2WD until conditions to switch to 2WD have been satisfied. Accordingly, a situation can be prevented where the drive state is switched from AWD to 2WD despite a situation where excessive slipping would reoccur, for example. Also, a situation can be prevented where switching from 2WD to AWD and switching from AWD to 2WD frequently and repeatedly occurs in a case where excessive slipping occurs multiple times in a short period. This is particularly preferable in the present disclosure, when arranging so that switching from AWD to 2WD can be performed promptly as described above.

In a case where lateral acceleration (lateral G) exceeding a predetermined threshold value acts on the vehicle 3, the lateral G serves as the determination standard for the increase forbidding determination unit in the present disclosure, based on the idea that the friction coefficient of the roads surface is high and there is no need to travel using AWD. This prevents from switching to AWD even though there is no need to switch to AWD, such as a case where the driver intentionally performs steering operations such that the steering angle suddenly changes on a road surface with a high friction coefficient such as a dry road or the like, which generates lateral Gs of the predetermined threshold value. This also enables switching to AWD in a situation where the friction coefficient of the road surface is low and AWD is necessary for traveling, in a case where lateral Gs exceeding the predetermined threshold value have not been generated at the vehicle.

In this case, the control device preferably further includes a subtraction slip point calculating unit (e.g., later-described subtraction slip point calculating unit 69) that calculates subtraction slip points in a time-discrete manner, based on the slip acquisition unit having not acquired that an excessive slip has occurred, the cumulative slip point calculating unit accumulating the subtraction slip points in addition to the addition slip points.

Subtraction slip points are calculated in a time-discrete manner, based on the slip acquisition unit having not acquired that an excessive slip has occurred, and subtraction slip points are accumulated in addition to addition slip points. Accordingly, in a case where the cumulative slip points exceed the drive state switching threshold value and thereafter are smaller than drive state switching threshold value, the drive state is switched to 2WD. Thus, traveling continues in AWD until configuration can be made that the excessive slipping has ended. In a case where elapse of a certain amount of time from an excessive slip having occurred triggers switching from AWD to 2WD, the drive state is switched from AWD to 2WD even if in the middle of an excessive slip, but occurrence of such problems can be avoided by the present disclosure.

Thus, according to the present disclosure, a vehicle drive system can be provided where drive efficiency is improved while securing vehicle stability, by determining whether or not to switch the drive state of the vehicle at a more appropriate timing. The word "unit" used in this application may mean a physical part or component of computer hardware or any device including a controller, a processor, a memory, etc., which is particularly configured to perform functions and steps disclosed in the application.

BRIEF DESCRIPTION OF THE DRAWINGS

FIG. 22 is a time chart illustrating another example of drive state switching control according to the embodiment.

DESCRIPTION OF THE PREFERRED EMBODIMENTS

Figure 1:
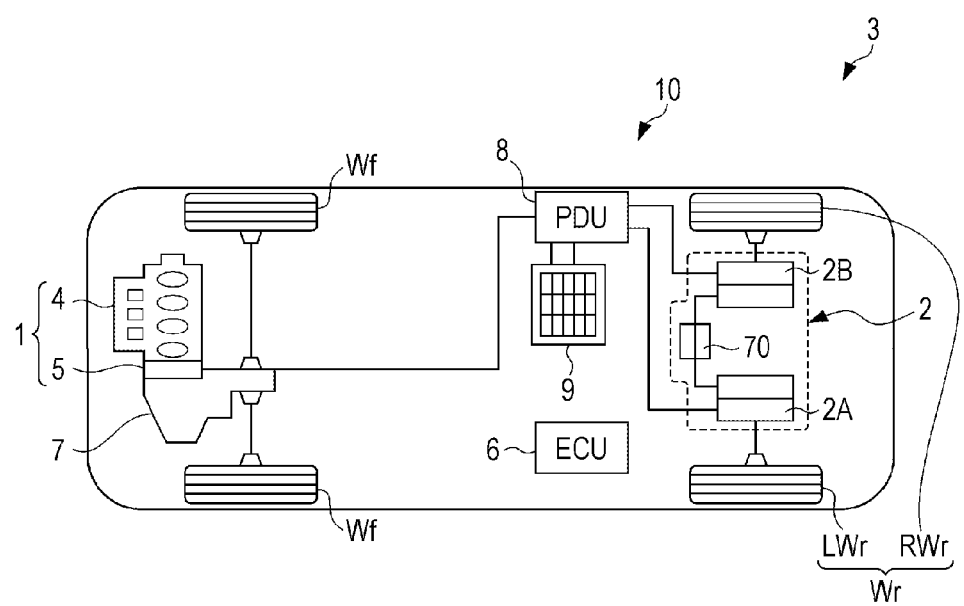
FIG. 1 is a diagram illustrating a vehicle in which is installed a vehicle drive system according to an embodiment.

Embodiments will be described in detail with reference to the drawings. Note that configurations and steps in a second and subsequent embodiments that are the same with those in a first embodiment will be denoted by the same reference numerals, and description thereof will be omitted.

First Embodiment

FIG. 1 is a diagram illustrating a vehicle in which is installed a vehicle drive system according to a first embodiment. A vehicle 3 in which is installed the vehicle drive system 10 according to the embodiment is a hybrid vehicle. The vehicle drive system 10 installed in the vehicle 3 includes a first drive device 1, a second drive device 2, an electronic control unit (hereinafter "ECU") 6 serving as a control device to control these drive devices, a power drive unit (PDU) 8, and a battery 9, as illustrated in FIG. 1.

The first drive device 1 is disposed toward the front of the vehicle 3, and drives front wheels Wf which are first drive wheels. The first drive device 1 has an internal combustion engine (ENG) 4, an electric motor 5, and a transmission 7. The internal combustion engine 4 and the electric motor 5 are connected serially, with the torque from the internal combustion engine 4 and electric motor 5 being transmitted to the front wheels Wf via the transmission 7.

The internal combustion engine 4 is an inline four-cylinder engine for example, that generates torque to drive the vehicle 3 by burning fuel. The crankshaft of the internal combustion engine 4 is linked to the output shaft of the electric motor 5.

The electric motor 5 is a three-phase AC motor for example, that generates torque to drive the vehicle 3 by electric power stored in the battery 9. The electric motor 5 is connected to the battery 9 via the PDU 8 that has an inverter, and assists the drive force of the internal combustion engine 4.

The transmission 7 converts the torque generated at the internal combustion engine 4 into revolutions and torque at a desired transmission gear ratio, and transmits to the front wheels Wf.

The second drive device 2 is disposed toward the rear of the vehicle 3, and drives rear wheels Wr (RWr and LWr) serving as second drive wheels. The second drive device 2 includes electric motors 2A and 2B, and a motor traction control system (M-TCS) 70. The torque of the electric motors 2A and 2B is transmitted to the rear wheels Wr (RWr and LWr).

The electric motors 2A and 2B are three-phase AC motors for example, in the same way as the electric motor 5, and generate torque to drive the vehicle 3 by electric power stored in the battery 9. The electric motors 2A and 2B are also connected to the battery 9 via the PDU 8 that has an inverter, and electric power supply from the battery 9 and regeneration of energy to the battery 9 are controlled by control signals being input from the ECU 6 to the PDU 8.

The M-TCS 70 executes motor traction control for the second drive device 2. Specifically, the M-TCS 70 controls the rotation state of the rear wheels RWr and LWr by controlling torque generated by the electric motors 2A and 2B based on the wheel rotations of the rear wheels RWr and LWr and the motor rotations of the electric motors 2A and 2B, thereby preventing the rear wheels RWr and LWr from spinning.

Each of the front wheels Wf and rear wheels Wr (RWr and LWr), of which there are four in all, is provided with a friction brake omitted from illustration. The friction brakes are configured using hydraulic disk brakes, for example. When the driver steps of the brake pedal, the depressing force is transmitted to the brake pads having been amplified through a hydraulic cylinder and so forth, and frictional force is generated between the brake disk attached to each drive wheel and the brake pads, thereby braking the drive wheels.

The second drive device 2 will be described in further detail. Note that the second drive device 2 is described in detail in Japanese Unexamined Patent Application Publication No. 2010-235051 that has been applied for and disclosed by the Present Inventor, the entire contents of which are incorporated by reference.

Figure 2:
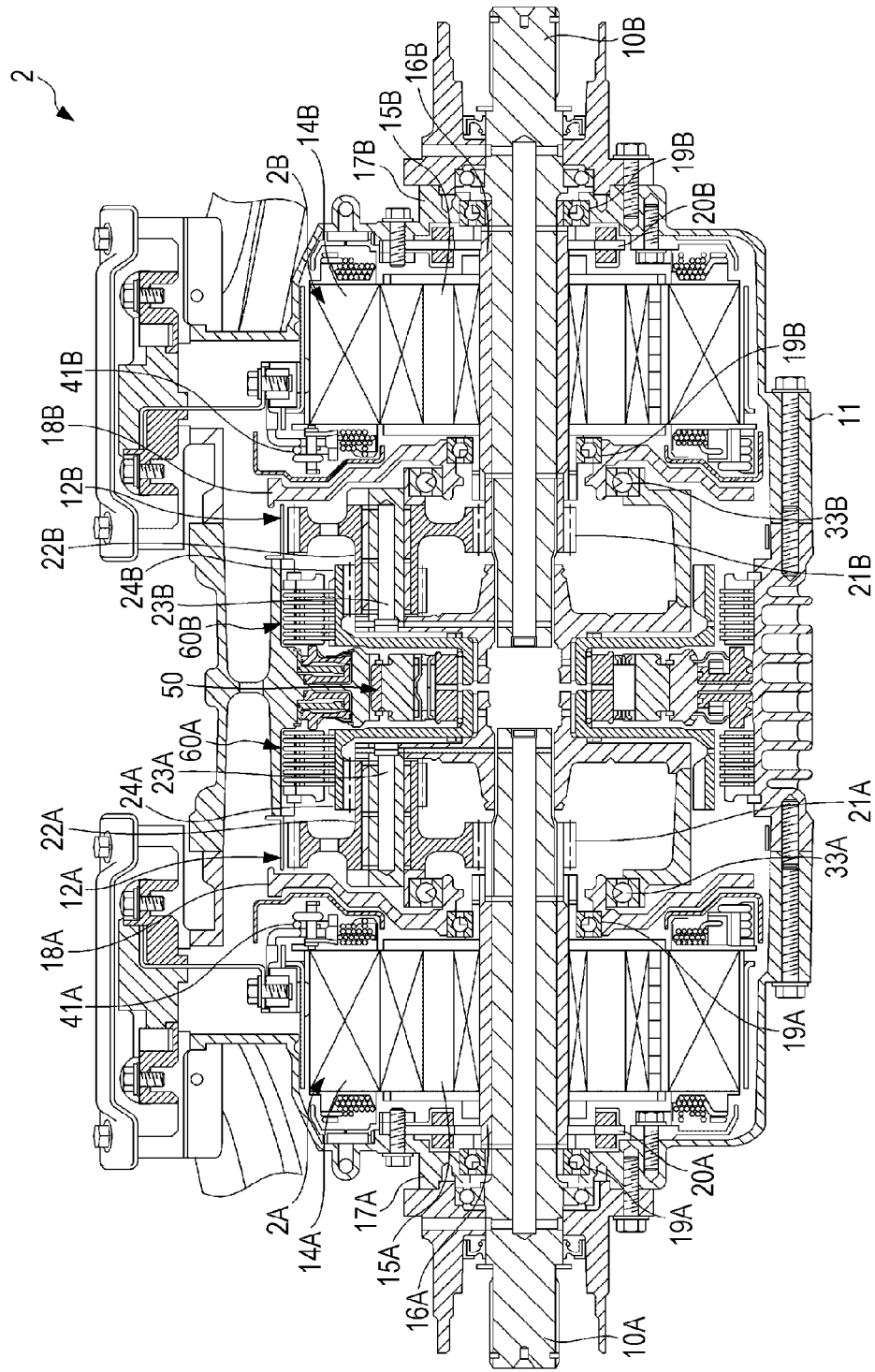
FIG. 2 is a longitudinal-sectional diagram of a second drive device according to the embodiment.
Figure 3:
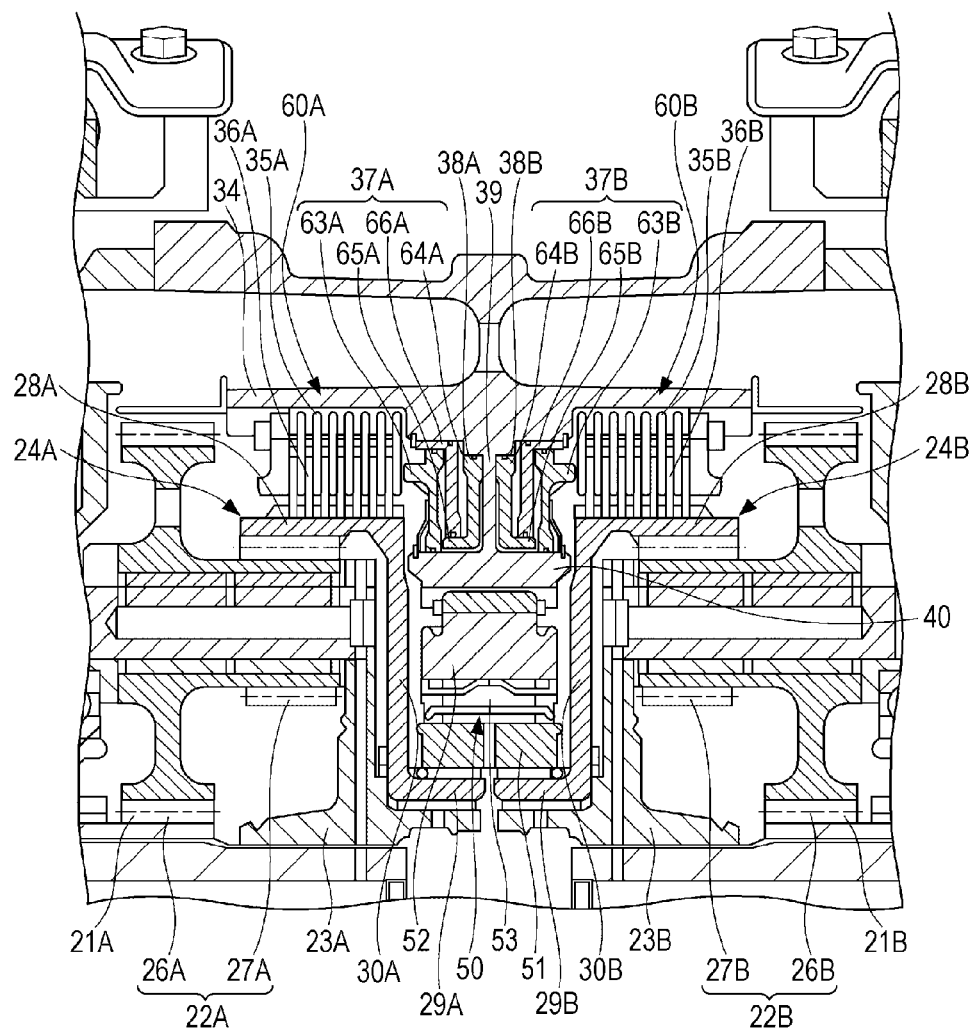
FIG. 3 is a partial enlarged view of the second drive device illustrated in FIG. 2.

FIG. 2 is a longitudinal-sectional view of the second drive device 2 according to the present embodiment. FIG. 3 is a partial enlarged view of the second drive device 2 illustrated in FIG. 2. The second drive device 2 has output shafts 10A and 10B that transmit drive force to the rear wheels RWr and LWr of the vehicle 3, and are disposed coaxially in the width direction of the vehicle, as illustrated in FIGS. 2 and 3. These output shafts 10A and 10B are connected to the axles of the rear wheels RWr and LWr Disposed inside a reducer case 11 are the electric motors 2A and 2B that drive the output shafts 10A and 10B, and planetary gear reducers 12A and 12B that reduce drive rotations of the electric motors 2A and 2B, disposed coaxially with the output shafts 10A and 10B.

Stators 14A and 14B of the electric motors 2A and 2B are fixed on the inner portions of the left and right ends of the reducer case 11, and ring-shaped rotors 15A and 15B are rotatably disposed on there inner circumference side of the stators 14A and 14B. Cylindrical shafts 16A and 16B that surround the outer circumference of the output shafts 10A and 10B are joined to the inner circumferential portions of the rotors 15A and 15B, so that the cylindrical shafts 16A and 16B are supported so as to coaxial with the output shafts 10A and 10B and rotate relative thereto. Provided to end walls 17A and 17B of the reducer case 11 are resolvers 20A and 20B that detect rotational position information of the rotors 15A and 15B.

The planetary gear reducers 12A and 12B have sun gears 21A and 21B, multiple planetary gears 22A and 22B that mesh with the sun gears 21A and 21B, planetary carriers 23A and 23B that support these planetary gears 22A and 22B, and ring gears 24A and 24B that mesh with the outer side of the planetary gears 22A and 22B. Drive force of the electric motors 2A and 2B is input from the sun gears 21A and 21B, and the reduced drive force is output from the planetary carriers 23A and 23B. The aforementioned Japanese Unexamined Patent Application Publication No. 2010-235051, the entire contents of which are incorporated by reference, should be referenced for details of the planetary gear reducers 12A and 12B.

A cylindrical space portion is secured between the reducer case 11 and the ring gear 24A, with a hydraulic brake 60 that brakes the ring gears 24A and 24B being disposed within the space overlapping a second pinion 26A in the radial direction and overlapping a first pinion 27A in the axial direction. The hydraulic brake 60 has multiple fixed plates 35 spline-fit at the inner circumferential face of the reducer case 11, and multiple rotating plates 36 spline-fit on the outer circumferential face of the ring gear 24A, disposed alternately in the axial direction, with the plates 35 and 36 being engaged or released by a ring-shaped piston 37.

The piston 37 is accommodated in a ring-shaped cylinder chamber 38 famed between the reducer case 11 and a support wall 39 and a cylinder support portion 42, so as to be capable of advancing from and retracting to the cylinder chamber 38. The piston 37 is advanced by high-pressure oil being introduced into the cylinder chamber 38, and the piston 37 is retracted by discharging oil from the cylinder chamber 38. The hydraulic brake 60 is connected to an oil pump. The aforementioned Japanese Unexamined Patent Application Publication No. 2010-235051, the entire contents of which are incorporated by reference, should be referenced for details of the hydraulic brake 60 and piston 37.

A cylindrical space portion is also secured between the reducer case 11 and the ring gear 24B, with a one-way clutch 50 that transmits only power in one direction to the ring gears 24A and 24B and cuts off power in the other direction disposed within this space. The one-way clutch 50 is configured with a great number of sprags 53 interposed between an inner race 51 and an outer race 52, the inner race 51 being integrally famed with a gear portion 28B of the ring gear 24B. The outer race 52 is positioned by the inner face of the reducer case 11, and prevented from turning.

On the other hand, the one-way clutch 50 is configured to engage and lock rotation of the ring gears 24A and 24B when the vehicle 3 is traveling forward under the drive force of the electric motors 2A and 2B. More specifically, the one-way clutch 50 is configured to lock or disengage the ring gears 24A and 24B in the direction of torque acting on the ring gears 24A and 24B, and to lock rotation of the ring gears 24A and 24B in a case where torque in the opposite direction from the forward rotation direction of the sun gears 21A and 21B, when the vehicle 3 travels forward acts on the ring gears 24A and 24B.

The second drive device 2 configured in this way has the planetary gear reducers 12A and 12B facing each other in the axial direction at the middle portion, with the ring gear 24A of the planetary gear reducer 12A and the ring gear 24B of the planetary gear reducer 12B bing linked. The linked ring gears 24A and 24B are rotate supported by the cylinder support portion 42 of the reducer case 11 via a bearing 43. The hydraulic brake 60 is also disposed in space between the outer side of the planetary gear reducer 12A and the reducer case 11, and the one-way clutch 50 is disposed in space between the outer side of the planetary gear reducer 12B and the reducer case 11, with the piston 37 that operates the hydraulic brake 60 being disposed on the outer face of the bearing 34 between the hydraulic brake 60 and the one-way clutch 50.

Figure 4:
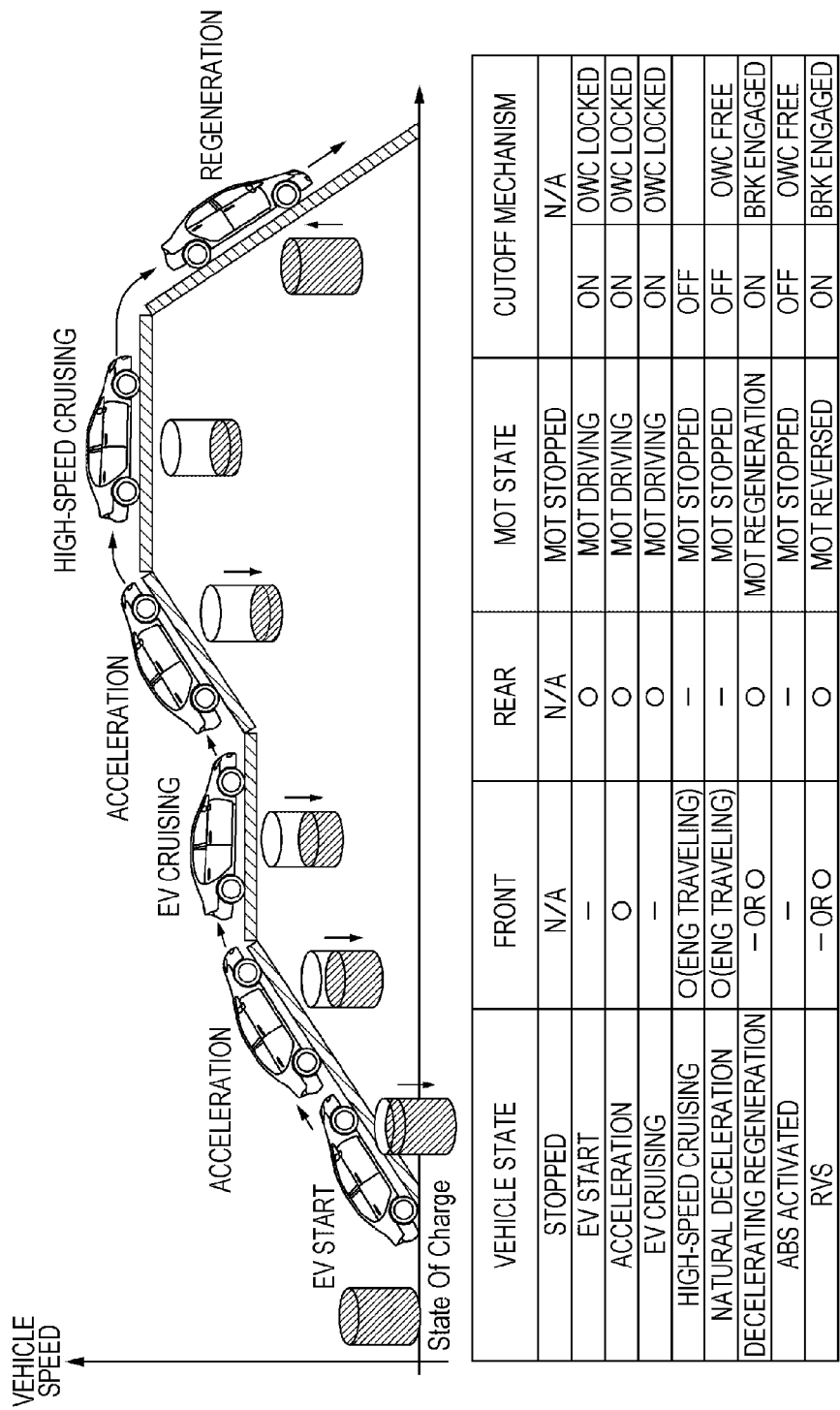
FIG. 4 is a diagram illustrating states of an electric motor and states of a cutoff mechanism, in a traveling state of a vehicle according to the embodiment.

Operations of the second drive device 2 that has the above-described configuration during normal traveling will be described. FIG. 4 is a diagram illustrating the state of the electric motors 2A and 2B and the state of a cutoff mechanism (one-way clutch 50 and hydraulic brake 60) when the vehicle is traveling. The "front" in FIG. 4 means the first drive device 1 that drives the front wheels Wf, and the "rear" means the second drive device 2 that drives the rear wheels Wr (RWr, LWr). The circles indicate operation (including driving and regeneration), and the hyphens indicate not operating (stopped). The "MOT state" indicates the state of the electric motors 2A and 2B of the second drive device 2. Further "ON" for the "cutoff mechanism" means that the ring gears 24A and 24B are locked, and "OFF" means that the ring gears 24A and 24B are in a free state. Also, "OWC" means the one-way clutch 50, and "BRK" means the hydraulic brake 60.

First, when stopped, the first drive device 1 at the front wheels Wf side and the second drive device 2 at the rear wheels Wr (RWr, LWr) side are both stopped, so the electric motors 2A and 2B are stopped, and the cutoff mechanism also is in a non-operating state. Next, after the key position is changed to ON, and an electric vehicle (EV) start is performed, the electric motors 2A and 2B of the second drive device 2 start. At this time, the cutoff mechanism is locked by the one-way clutch 50, and the power from the electric motors 2A and 2B is transmitted to the rear wheels RWr and LWr.

Then, acceleration is performed in an AWD (four wheels) state where both the first drive device 1 and second drive device 2 are driving. At this time as well, the cutoff mechanism is locked by the one-way clutch 50, and the power from the electric motors 2A and 2B is transmitted to the rear wheels RWr and LWr.

When performing EV cruising at low to mid-range speeds, the electric motor efficiency is good, so a rear wheel drive (RWD) state is entered where the first drive device 1 is in a non-operating state and only the second drive device 2 is driving. At this time as well, the cutoff mechanism is locked by the one-way clutch 50, and the power from the electric motors 2A and 2B is transmitted to the rear wheels RWr and LWr.

On the other hand, when performing high-speed cruising at a high speed range, the engine efficiency is good, so a front wheel drive (FWD) state is entered where the first drive device 1 is in an operating state. At this time, the one-way clutch 50 of the cutoff mechanism is disengaged (OWC free) and the hydraulic brake 60 is not operated, so the electric motors 2A and 2B stop. In a case of natural deceleration as well, the one-way clutch 50 of the cutoff mechanism is disengaged (OWC free) and the hydraulic brake 60 is not operated, so the electric motors 2A and 2B stop.

Now, when performing decelerating regeneration, e.g., when driving by drive force of the first drive device 1, the one-way clutch 50 is disengaged (OWC free) at one side of the cutoff mechanism but the hydraulic brake 60 is engaged, so regenerative charging is performed at the electric motors 2A and 2B. When traveling normally, the energy from traveling is recovered by regeneration at the electric motors 2A and 2B by collaboration with the braking control by the friction brakes. However, in a case of an emergency braking request (e.g., in a case where the antilock brake system (ABS) is activated), regeneration at the electric motors 2A and 2B is forbidden, and braking control by the friction brakes is given priority. In this case, the one-way clutch 50 is in a disengaged state (OWC free), and the hydraulic brake 60 is note operated, so the electric motors 2A and 2B stop.

In a case of backing up, either a RWD state where the first drive device 1 stops and the second drive device 2 is driven, or an AWD state where both the first drive device 1 and second drive device 2 are driven, is realized. At this time, the electric motors 2A and 2B rotate in reverse, and the one-way clutch 50 at one side of the cutoff mechanism is disengaged (OWC free), but the power of the electric motors 2A and 2B is transmitted to the rear wheels RWr and LWr by connecting the hydraulic brake 60.

Next, the configuration of the ECU 6 serving as a control device according to the present embodiment will be described. The ECU 6 includes an input circuit having functions of shaping input signal waveforms from various types of sensors, correcting voltage levels to predetermined levels, converting analog signal values to digital signal values, and so forth, and a central processing unit (hereinafter "CPU"). The ECU 6 also has a storage circuit that stores various types of computation programs executed by the CPU and the results of computation and so forth, and an output circuit that outputs control signals to the PDU 8 and internal combustion engine 4, and so forth.

Figure 5:
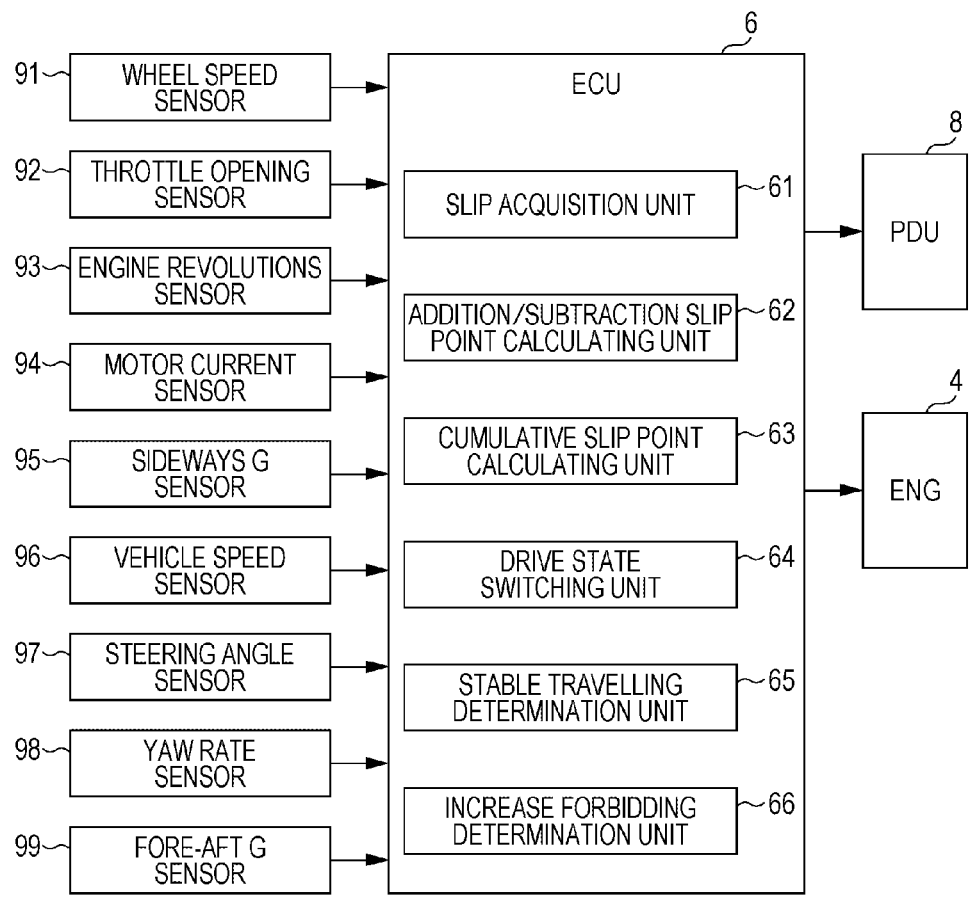
FIG. 5 is a functional block diagram illustrating the configuration of an ECU according to the embodiment.

The ECU 6 having the hardware configuration such as described above executes drive state switching control, where the drive state of the vehicle 3 is switched. FIG. 5 is a functional block diagram illustrating the configuration of the ECU 6 and the connection relationship of the parts connected to the ECU 6 according to the present embodiment. The ECU 6 receives input of detection signals of various types of sensors, such as a wheel speed sensor 91, throttle opening sensor 92, engine revolutions sensor 93, motor current sensor 94, lateral G sensor 95, vehicle speed sensor 96, steering angle sensor 97, yaw rate sensor 98, fore-aft G sensor 99, and so forth, as illustrated in FIG. 5. The ECU 6 also outputs control signals to the PDU 8 and the internal combustion engine 4. The ECU 6 further includes a slip acquisition unit 61, addition/subtraction slip point calculating unit 62, cumulative slip point calculating unit 63, drive state switching unit 64, stable traveling determination unit 65, and increase forbidding determination unit 66, as modules that execute drive state switching control. The functions of the modules will be described next.

The slip acquisition unit 61 acquires that an excessive slip, which is slipping a predetermined amount or more, has occurred at the front wheels Wf serving as first drive wheels or rear wheels Wr (RWr, LWr) serving as second drive wheels. Specifically, the slip acquisition unit 61 acquires that an excessive slip has occurred based on wheel speed difference of the front wheels Wf and rear wheels Wr (RWr, LWr) detected by the wheel speed sensor 91. When having acquired that an excessive slip has occurred, the slip acquisition unit 61 sets a slip determination flag to "1", and when not having acquired that an excessive slip has occurred, sets the slip determination flag to "0". Now, the vehicle 3 can be deemed to be constantly experiencing minute slippage at the drive wheels even if the road is dry and the friction coefficient is high. Accordingly, the term "excessive slip" in the present embodiment excludes such minute slippage. Hereinafter, occurrence of excessive slipping may also be referred to simply as slipping.

Figure 6:
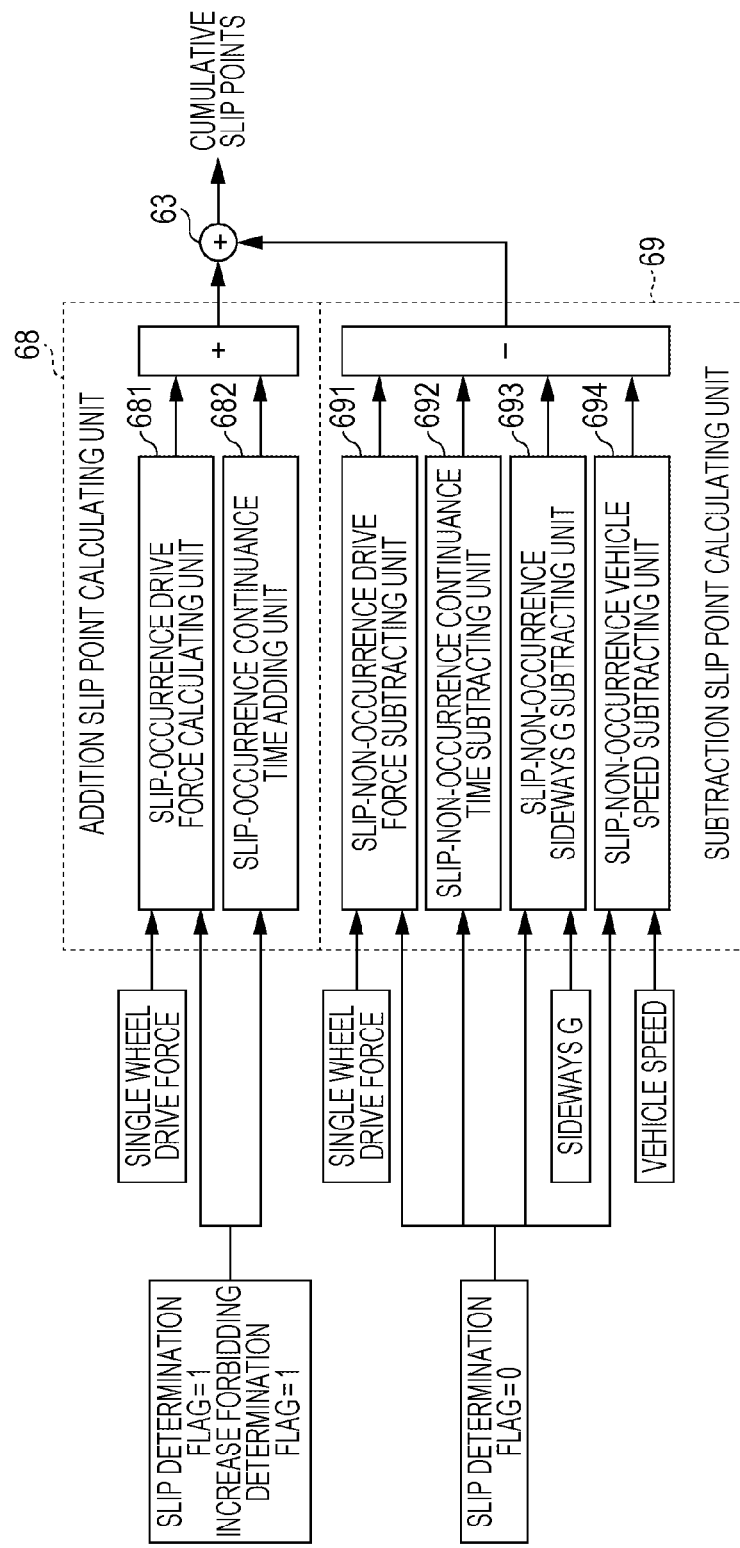
FIG. 6 is a functional block diagram illustrating the configuration of an addition/subtraction slip point calculating unit according to the embodiment.

The addition/subtraction slip point calculating unit 62 calculates addition/subtraction slip points, that are addition slip points or subtraction slip points, in a time-discrete manner, based on the slip acquisition unit 61 having or having not acquired that an excessive slip has occurred, or the increase forbidding determination unit 66 forbidding or not forbidding calculation or accumulation of addition slip points, or increase of the cumulative slip points. This point will be described with reference to FIG. 6. FIG. 6 is a functional block diagram illustrating the configuration of the addition/subtraction slip point calculating unit 62 according to the present embodiment. The addition/subtraction slip point calculating unit 62 includes an addition slip point calculating unit 68 and a subtraction slip point calculating unit 69, as illustrated in FIG. 6. When the slip acquisition unit 61 has acquired that an excessive slip has occurred, i.e., when the slip determination flag is "1", the addition slip point calculating unit 68 calculates addition slip points based on drive force correlation values having correlation with the drive force of the drive wheel where the excessive slip has occurred, and slip-occurrence continuation time, and transmits the calculated addition slip point to the cumulative slip point calculating unit 63, as illustrated in FIG. 6. Note, however, that in a case where the increase forbidding determination unit 66 has forbidden calculation or accumulation of addition slip points, or increase of the cumulative slip points, i.e., in a case where the slip determination flag is "1", the addition slip point calculating unit 68 does not calculate the addition/subtraction slip points based on drive force correlation values or slip-occurrence continuation time.

On the other hand, in a case where the slip determination flag is "0", the subtraction slip point calculating unit 69 calculates subtraction slip points having a negative value, based on drive force correlation values having correlation with the drive force of drive wheels where excessive slipping is not occurring, or slip-non-occurrence continuation time, and transmits the calculated subtraction slip points to the cumulative slip point calculating unit 63. Examples of drive force correlation values include wheel (single-wheel) drive force, wheel (single-wheel) torque, drive force of the first drive device 1 and second drive device 2 that drive the wheels, and torque of the first drive device 1 and second drive device 2 that drive the wheels. The following description will be made regarding wheel (single-wheel) drive force.

The addition slip point calculating unit 68 has a slip-occurrence drive force adding unit 681 and slip-occurrence continuance time adding unit 682. The addition slip point calculating unit 68 adds the positive value addition slip points calculated at these adding units to calculate an addition slip point.

The slip-occurrence drive force adding unit 681 calculates addition/subtraction slip points based on a drive force correlation value when the increase forbidding determination flag is "0". Specifically, a drive force addition slip point is calculated as the addition slip point, by searching in a later-described drive force addition slip point calculation table (see FIG. 10) created and stored beforehand, in accordance with a single-wheel drive force N at the time of slippage occurring. The lower the single-wheel drive force at the time of the slip occurring is, the greater the drive force addition slip point calculated by the slip-occurrence drive force adding unit 681 is, provided that the range of a drive state switching threshold value, which is a threshold value serving as a standard for the later-described drive state switching unit 64 to switch the drive state, is not exceeded.

Now, the team "single-wheel drive force" as used in the present specification means that largest drive force of the drive forces of each of the four wheels of the vehicle 3. The single-wheel drive force is detected by sensors, and also estimated and acquired based on, for example, the throttle opening detected by the throttle opening sensor 92, the engine revolutions detected by the engine revolutions sensor 93 motor currents detected by the motor current sensors 94 provided to each of the electric motors 5, 2A, and 2B, and so forth. It should be noted, however, that when the increase forbidding determination flag is "1", the slip-occurrence drive force adding unit 681 does not calculate addition/subtraction slip points based on the drive force correlation value, but rather calculates the value of zero.

When the increase forbidding determination flag is "0", the slip-occurrence continuance time adding unit 682 calculates addition/subtraction slip points based on the continuation time of slipping occurring. Specifically, a later-described time addition slip point calculation table (see FIG. 11) created and stored beforehand is searched, in accordance with the slip-occurrence continuance time (seconds), i.e., the continuance time of the slip determination flag "1", thereby calculating time addition slip points as addition slip points. The slip-occurrence continuance time adding unit 682 calculates time addition slip points that are larger the longer the slip-occurrence continuance time is, until the cumulative value of time addition slip points exceeds the later-described drive state switching threshold value, and after the cumulative value exceeds the drive state switching threshold value continues to calculate time addition slip points that are approximately 0. It should be noted, however, that when the increase forbidding determination flag is "1", the slip-occurrence continuance time adding unit 682 does not calculate addition/subtraction slip points based on slip-occurrence continuation time in this way, but rather calculates the value of zero.

Also, the subtraction slip point calculating unit 69 includes a slip-non-occurrence drive force subtracting unit 691, slip-non-occurrence continuance time subtracting unit 692, slip-non-occurrence lateral G subtracting unit 693, and slip-non-occurrence vehicle speed subtracting unit 694, as illustrated in FIG. 6. Subtraction slip points are calculated by the subtraction slip point calculating unit 69 by adding the negative subtraction slip points calculated at these subtracting units.

The slip-non-occurrence drive force subtracting unit 691 calculates drive force subtraction slip points as subtraction slip points by searching a later-described drive force subtraction slip point calculation table (see FIG. 13) created and stored beforehand, in accordance with single-wheel drive force N when no slipping is occurring. The slip-non-occurrence drive force subtracting unit 691 calculates the drive force subtraction slip points to be 0 where the single-wheel drive force when no slip is occurring to be smaller than a predetermined value, and calculates a certain drive force subtraction slip point having a relatively large absolute value when at the predetermined value or higher.

The slip-non-occurrence continuance time subtracting unit 692 calculates time subtraction slip points as subtraction slip points by searching a later-described time subtraction slip point calculation table (see FIG. 15) created and sorted beforehand, in accordance with the slip-non-occurrence continuance time (seconds), i.e., the continuation time of the slip determination flag "0". The slip-non-occurrence continuance time subtracting unit 692 calculates certain time subtraction slip points having a relatively small absolute value, regardless of the slip-non-occurrence continuance time.

The slip-non-occurrence lateral G subtracting unit 693 calculates lateral G subtraction slip points as subtraction slip points by searching a later-described lateral G subtraction slip point calculation table (see FIG. 17) that has been created and stored beforehand, in accordance with lateral Gs detected by the lateral G sensor 95 when slippage is not occurring. The slip-non-occurrence lateral G subtracting unit 693 calculates a lateral G subtraction slip point as 0 when the lateral G when no slippage is occurring is smaller than a predetermined value, and calculates a certain lateral G subtraction slip point that has a relatively large absolute value when at the predetermined value or above.

The slip-non-occurrence vehicle speed subtracting unit 694 calculates vehicle speed subtraction slip points as subtraction slip points by searching a later-described vehicle speed subtraction slip point calculation table (see FIG. 19) that has been created and stored beforehand, in accordance with vehicle speed detected by the vehicle speed sensor 96 when slippage is not occurring. The slip-non-occurrence vehicle speed subtracting unit 694 calculates a certain vehicle speed subtraction slip point having a relatively large absolute value when the vehicle speed when no slippage is occurring is smaller than a predetermined value, and calculates the vehicle speed subtraction slip point as 0 when at the predetermined value or above.

The cumulative slip point calculating unit 63 integrates the addition slip points calculated by the addition slip point calculating unit 68 and the subtraction slip points calculated by the subtraction slip point calculating unit 69, thereby calculating cumulative slip points over time.

Returning to FIG. 5, based on the cumulative slip points calculated by the cumulative slip point calculating unit 63, the drive state switching unit 64 switches between 2WD where the vehicle 3 is driven by just one of the front wheels Wf serving as first drive wheels and rear wheels Wr (RWr, LWr) serving as second drive wheels, and AWD where the vehicle 3 is driven by both front wheels Wf serving as first drive wheels and rear wheels Wr (RWr, LWr) serving as second drive wheels. 2WD includes FWD where the vehicle 3 is driven by just the front wheels Wf, and RWD where the vehicle 3 is driven by just the rear wheels Wr (RWr, LWr). Accordingly, the drive state switching unit 64 executes switching among FWD, RWD, and AWD.

Specifically, the drive state switching unit 64 sets the slip AWD request flag to "1" in a case where the cumulative slip points are at the drive state switching threshold value or higher, and switches the drive state of the vehicle 3 to AWD. Also, the drive state switching unit 64 sets the slip AWD request flag to "0" in a case where the cumulative slip points are below the drive state switching threshold value and also a later-described stable traveling determination flag is "1", and switches the drive state of the vehicle 3 to 2WD. The drive state switching threshold value is set beforehand to an appropriate value as an index for switching between AWD and 2WD.

Further, when setting the drive state of the vehicle 3 to 2WD, the drive state switching unit 64 measures the vehicle speed using the vehicle speed sensor 96. If the measurement results show that the vehicle speed is low to mid-range EV cruising, the electric motor efficiency is good, so the drive state is switched to RWD where the first drive device 1 is in a non-operating state and only the second drive device 2 is driving. On the other hand, if the vehicle speed is determined to be high-speed cruising at a high speed range, the engine efficiency is good, so the drive state is switched to FWD where the first drive device 1 is in an operating state.

The stable traveling determination unit 65 performs stable traveling determination regarding whether or not the vehicle 3 is traveling in a stable manner. Specifically, in a case where the slip AWD request flag is "1", The stable traveling determination unit 65 makes determination regarding whether or not the vehicle 3 is traveling in a stable state, based on detection values of the steering angle sensor 97, yaw rate sensor 98, lateral G sensor 95, vehicle speed sensor 96, fore-aft G sensor 99, and so forth, and estimation values using these detection values. When determination is made that the vehicle 3 is traveling in a stable state, the stable traveling determination unit 65 sets the stable traveling determination flag to "1", and when determination is made that the vehicle 3 is not traveling in a stable state, sets the stable traveling determination flag to "0". As described above, the drive state switching unit 64 switches the drive state of the vehicle 3 to 2WD under the condition that the stable traveling determination flag is "1".

Thus, performing stable traveling determination, and using this as one of the conditions to switch to 2WD, enables prevention of switching from AWD to 2WD despite a situation where stable traveling cannot be confirmed and excessive slipping would reoccur. Also, a situation where switching from 2WD to AWD and switching from AWD to 2WD frequently and repeatedly occurs in a case where stable traveling cannot be confirmed and excessive slipping occurs multiple times in a short period. Note that the stable traveling determination flag is a permission determination flag for changing settings of the slip AWD request flag, and is not forcibly set with higher priority over other flags when the vehicle 3 is traveling in a stable state.

In a case where the slip determination flag is "1", the increase forbidding determination unit 66 performs increase forbidding determination regarding whether to forbid addition or accumulation of the addition slip points, or increase of the cumulative slip points, or to not forbid but permit these. Accordingly, increase forbidding determination is performed in the present embodiment based on lateral G (lateral acceleration) which is one of lateral acceleration correlation values having correlation with lateral acceleration of the vehicle.

Specifically, in a case where the vehicle 3 is subjected to lateral Gs exceeding a predetermined threshold value, it can be estimated that the friction coefficient of the road surface is high, and that there is no need to travel with AWD. Accordingly, in a case where lateral Gs exceeding the predetermined threshold value occur at the vehicle 3, the increase forbidding determination unit 66 sets the increase forbidding determination flag to "1", thereby forbidding addition or accumulation of the addition slip points, or increase of the cumulative slip points. Thus, the vehicle 3 traveling in 2WD is prevented from switching from 2WD to AWD. Also, even if the drive state has already been switched to AWD, forbidding addition or accumulation of the addition slip points, or increase of the cumulative slip points prevents cumulative slip points to be excessively accumulated, and enables prompt switching from AWD to 2WD after slipping has ended.

On the other hand, in a case where the vehicle 3 is only subjected to lateral Gs equal to or smaller than the predetermined threshold value, it can be estimated that the friction coefficient of the road surface is low, and that there is a need to travel in AWD. Accordingly, in a case where only lateral Gs at or below the predetermined threshold value occur at the vehicle 3, the increase forbidding determination unit 66 sets the increase forbidding determination flag to "0", thereby not forbidding but permitting addition or accumulation of the addition slip points, or increase of the cumulative slip points. Thus, the vehicle 3 traveling in 2WD can switch from 2WD to AWD. Also, even if the drive state has already been switched to AWD, addition or accumulation of the addition slip points, or increase of the cumulative slip points is permitted, enabling cumulative slip points to be accumulated, thereby preventing immediately switching from AWD to 2WD after slipping has ended.

Thus, forbidding addition or accumulation of the addition slip points, or increase of the cumulative slip points based on determination results of the increase forbidding determination unit 66 prevents 2WD from being switched to AWD despite the friction coefficient of the road surface being high and there being no need to use AWD, thereby preventing deterioration of fuel consumption or electricity consumption. Further, not forbidding but rather permitting addition or accumulation of the addition slip points, or increase of the cumulative slip points based on determination results of the increase forbidding determination unit 66 facilitates switching to AWD in a case of slipping on a road surface in a low friction coefficient state, such as in wet or frozen road conditions, thereby securing vehicle stability.

Next, the method of calculating lateral Gs in a case of the increase forbidding determination unit 66 performing increase forbidding determination will be described. The increase forbidding determination unit 66 calculates the lateral G, which is lateral acceleration on the vehicle 3, in a case where the slip determination flag is "1". In a case where the calculated lateral G is a lateral G threshold value for increase forbidding determination or higher, the increase forbidding determination is set to "1", and in a case where the calculated lateral G is smaller than the lateral G threshold value for increase forbidding determination, the increase forbidding determination flag is set to "0".

As for a specific lateral G calculation method, increase forbidding determination unit 66 detects lateral Gs by the lateral G sensor 95. Alternatively, the increase forbidding determination unit 66 calculates lateral Gs according to Lateral $G=(V^2 \times \sigma)/(1+A+V^2)/L$  Expression (1)

as disclosed in Japanese Unexamined Patent Application Publication No. 2013-209048, the entire contents of which are incorporated by reference. In Expression (1), V represents the vehicle speed detected by the vehicle speed sensor 96, σ represents the tire steering angle detected by the steering angle sensor 97, A is a stability factor, and L is the wheelbase.

In the same way, the increase forbidding determination unit 66 calculates lateral Gs according to Lateral $G=Yr \times V$  Expression (2)

as disclosed in the aforementioned Japanese Unexamined Patent Application Publication No. 2013-209048, the entire contents of which are incorporated by reference. In Expression (2), Yr represents the yaw rate detected by the yaw rate sensor 98, and V represents the vehicle speed detected by the vehicle speed sensor 96.

Note that in a case where the slip determination flag is "0", the increase forbidding determination unit 66 does not need to perform increase forbidding determination. The reason is that when the slip determination flag is "0", no addition of slip points is performed to begin with, although subtraction of slip points is performed. Accordingly, in a case where the slip determination flag is "0", the increase forbidding determination unit 66 does not perform increase forbidding determination, and leaves the slip determination flag set to "0".

Figure 7:
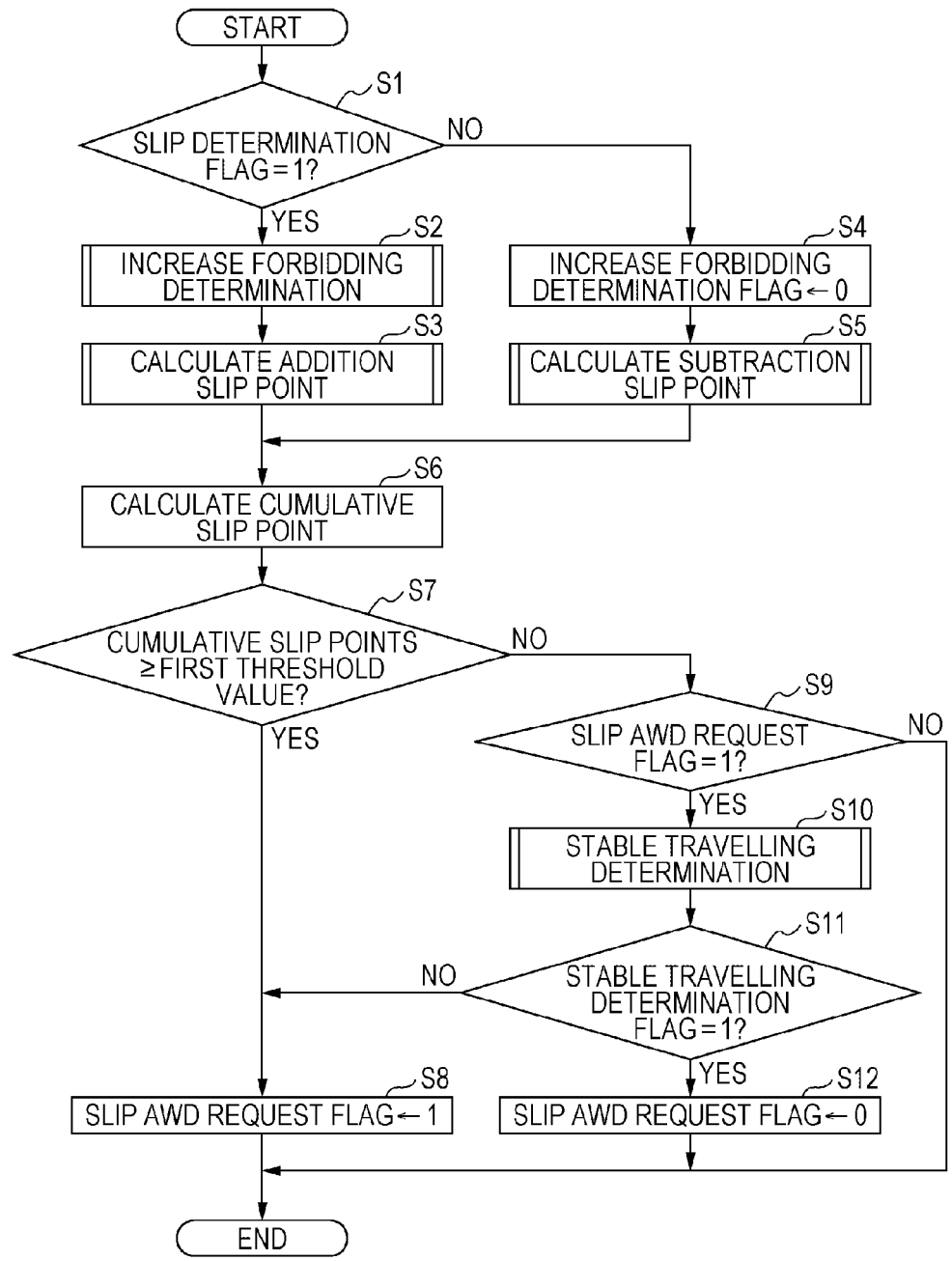
FIG. 7 is a flowchart illustrating procedures of drive state switchover control according to the embodiment.

Next, drive state switching control executed by the ECU 6 according to the present embodiment will be described. FIG. 7 is a flowchart illustrating procedures for drive state switching control according to the present embodiment. This control processing is repeatedly executed at the ECU 6.

In step S1, differentiation is made regarding the slip determination flag, whether "1" or not. In the case that this differentiation yields YES, occurrence of slipping has been acquired, so the flow advances to step S2, and increase forbidding determination is performed (step S2). The addition slip point is calculated taking into consideration the determination results of the increase forbidding determination (step S3), and thereafter the flow advances to step S6. If NO, no slipping has occurred, so the flow advances to step S4, the increase forbidding determination flag is set to "0", and advances to step S5 where the subtraction slip point is calculated. Thereafter the flow advances to step S6.

In step S6, the previous value of the cumulative slip points is integrated with the addition slip point calculated in step S3 or the subtraction slip point calculated in step S5, thereby calculating cumulative slip points. The flow then advances to step S7.

In step S7, differentiation is made regarding whether or not the cumulative slip points calculated in step S6 are the drive state switching threshold value or higher. In a case where this differentiation yields YES, the flow advances to step S8, and if NO, the flow advances to step S9.

In step S8, the slip AWD request flag is set to "1", and the flow ends. Thus, either the drive state is switched to AWD, or is maintained at AWD.

In step S9, differentiation is made regarding whether or not the slip AWD request flag is "1". In a case where this differentiation yields YES, the flow advances to step S10, and if NO, the flow advances to step S12.

In step S10, stable traveling determination, which is determination regarding whether or not the vehicle 3 is traveling in a stable state, is made. In a case where determination is made that the vehicle 3 is traveling in a stable state, the stable traveling determination flag is set to "1". In a case where determination is made that the vehicle 3 is not traveling in a stable state, the stable traveling determination flag is set to "0".

In step S11, differentiation is made regarding whether or not the stable traveling determination flag set by the stable traveling determination in step S10 is "1". In a case where this differentiation yields YES, stability of the vehicle 3 has been secured, so the flow advances to step S12, sets the slip AWD request flag to "0", and thereafter the flow ends. Thus, switching to 2WD, i.e., either FWD or RWD, is executed.

In a case where the differentiation in step S11 yields NO, stability of the vehicle 3 has not been secured, so the flow advances to step S8, the slip AWD request flag is set to "1", and the flow ends. Thus, AWD is maintained. Note that the steps relating to stable traveling determination, based on stable traveling of the vehicle 3 in steps S8 and S9, may be omitted.

Figure 8:
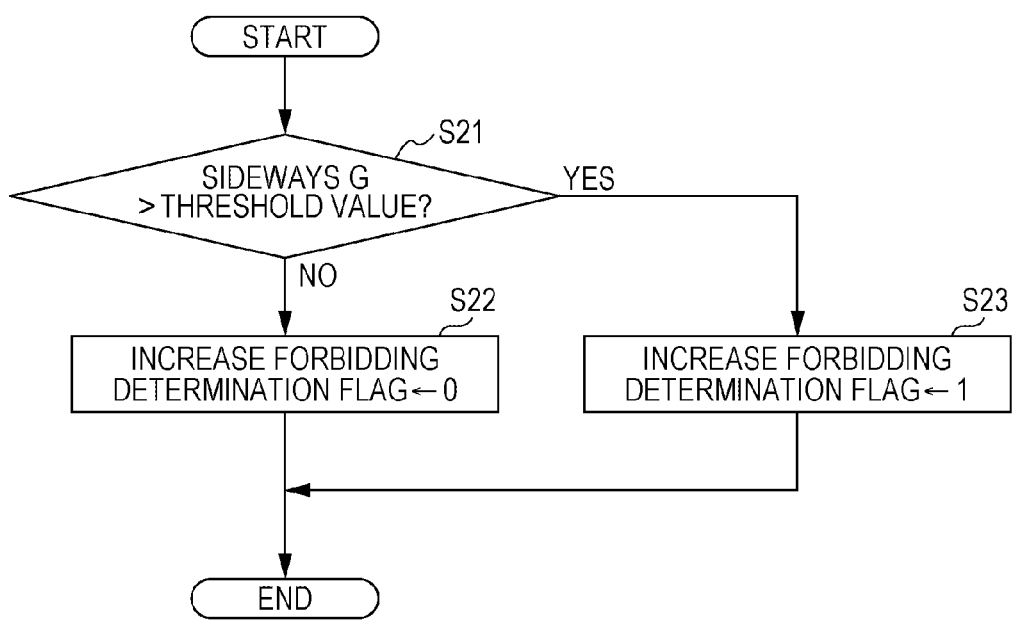
FIG. 8 is a flowchart illustrating procedures of increase forbidding processing according to the embodiment.

Next, the subroutines performed in steps S2, S3, S5, and S10 in FIG. 7 will be described with reference to the drawings. First, the increase forbidding determination processing according to the present embodiment that is executed in step S2 in FIG. 7 will be described. FIG. 8 is a flowchart illustrating the procedures of the increase forbidding determination processing according to the present embodiment.

In step S21, the increase forbidding determination unit 66 calculates the lateral Gs occurring at the vehicle 3, and differentiation is made regarding whether or not the calculated lateral Gs exceed the lateral G threshold value in the increase forbidding determination. The lateral G to compare with the threshold value is calculated from detection values of the lateral G sensor 95 and so forth. Alternatively, the lateral G may be calculated from Expressions (1) and (2) shown in the description of the increase forbidding determination unit 66. The threshold value for the lateral G in the increase forbidding determination is set to an appropriate value beforehand, as an index whereby the addition or accumulation of the addition slip points, or increase of the cumulative slip points, is forbidden. In a case where this differentiation yields YES, the flow advances to step S23 where the increase forbidding determination flag is set to "1", and thereafter the increase forbidding determination ends. If NO, the flow advances to step S22, the increase forbidding determination flag is set to "0", and the increase forbidding determination ends.

The addition slip point calculation processing according to the present embodiment, executed in step S3 of FIG. 7, will be described. In the addition slip point calculation processing according to the present embodiment, the addition slip points are calculated by the drive force addition slip point calculation processing performed by the slip-occurrence drive force adding unit 681 and the time addition slip point calculation processing performed by the slip-occurrence continuance time adding unit 682, following which processing of totaling these calculated addition slip points is performed by the cumulative slip point calculating unit 63. Note however, that as described above in the description of the addition/subtraction slip point calculating unit 62, when the increase forbidding determination flag is "0", positive value addition slip points are calculated based on drive force correlation values having correlation with the drive force of the drive wheel where the excessive slip has occurred, and slip-occurrence continuation time, but on the other hand, when the increase forbidding determination flag is "1", addition/subtraction slip points are not calculated based on drive force correlation values or slip-occurrence continuation time, and a value zero is calculated.

Figure 9:
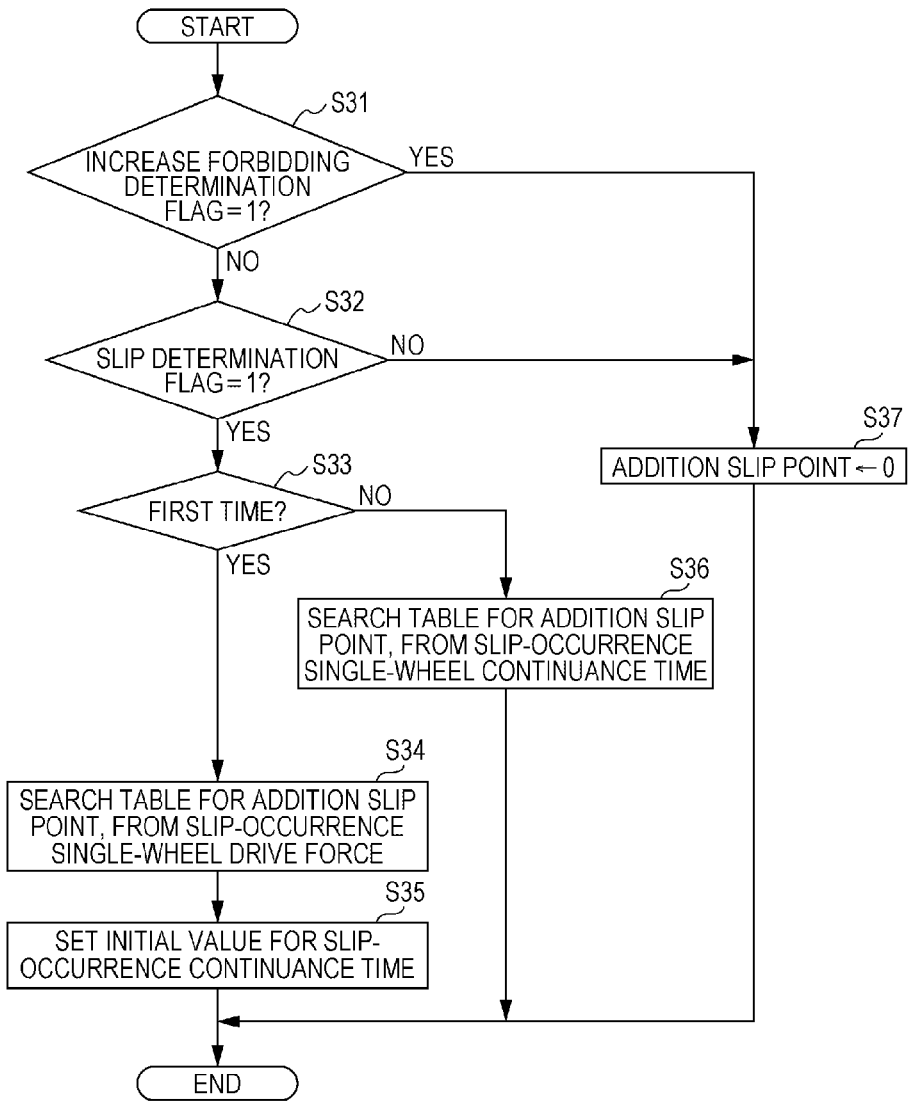
FIG. 9 is a flowchart illustrating procedures of addition slip point calculation processing according to the embodiment.

FIG. 9 is a flowchart illustrating procedures of the addition slip point calculation processing according to the present embodiment. In step S31, differentiation is made regarding whether or not the increase forbidding determination flag is set to "1", by the increase forbidding determination processing performed in step S2.

In step S32, differentiation is performed regarding whether or not the slip determination flag is "1". In a case where this differentiation yields YES, the flow advances to step S33, and if NO, the flow advances to step S37 where the addition slip point is set to "0", and the flow ends. The addition slip point is thus set to "0", so the value which the cumulative slip point calculating unit 63 adds to the cumulative slip points in the following step S5 will be zero. That is to say, the slip acquisition unit 61 has acquired that an excessive slip has occurred, but adding slip points to the cumulative slip points is forbidden.

In step S33, differentiation is made regarding whether this processing is being performed for the first time or not. In a case where this differentiation yields YES, the flow advances to step S34, and if NO, to step S36.

In step S34, a table search is performed for an addition slip point from single-wheel drive force when slippage is occurring. Specifically, a drive force addition slip point is calculated by searching the drive force addition slip point calculation table created beforehand and stored in the slip-occurrence drive force adding unit 681, in accordance with the single-wheel drive force when slippage is occurring. Thereafter, the flow advances to step S35.

Figure 10:
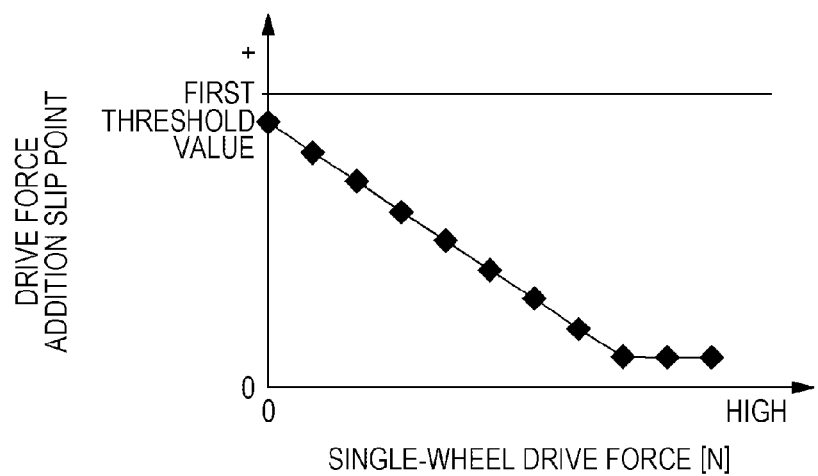
FIG. 10 is a diagram illustrating a drive force addition slip point calculation table stored in a slip-occurrence drive force adding unit according to the embodiment.

Now, FIG. 10 is a diagram illustrating the drive force addition slip point calculation table stored in the slip-occurrence drive force adding unit 681. The horizontal axis in FIG. 10 represents single-wheel drive force N, and the vertical axis represents the drive force addition slip point having a positive value. The drive force addition slip point calculation table illustrated in FIG. 10 is set such that the lower the drive force is regarding the single-wheel drive force when slippage is occurring, the greater the drive force addition slip point is in proportion, within a range that does not exceed the drive state switching threshold value. The reason is that when slipping, the lower the drive force is regarding single-wheel drive force the lower the friction coefficient of the road surface is, so setting the drive force addition slip point to a greater value switches to AWD quicker or maintains AWD traveling time longer. Note however, that when the single-wheel drive force reaches a certain level, the drive force addition slip point becomes constant.

Returning to FIG. 9, in step S35 an initial value is set for slip-occurrence continuation time, and the flow ends. This is the first time for this processing, so when step S35 is executed, the slip-occurrence continuation time will be 0 seconds. Accordingly, the time addition slip point is preferably 0. To this end, the cumulative value of time addition slip points when the slip-occurrence continuation time is 0 seconds, i.e., the initial value of the slip-occurrence continuation time, may be set to 0 as indicated by the Y-intercept in later-described FIG. 11, for example.

In step S36, a table search is performed for an addition slip point from slip-occurrence continuation time when slippage is occurring, and the flow ends. Specifically, the time addition slip point is calculated by searching the time addition slip point calculation table created beforehand and stored in the slip-occurrence continuance time adding unit 682, in accordance with the slip-occurrence continuation time, and the flow ends.

Figure 11:
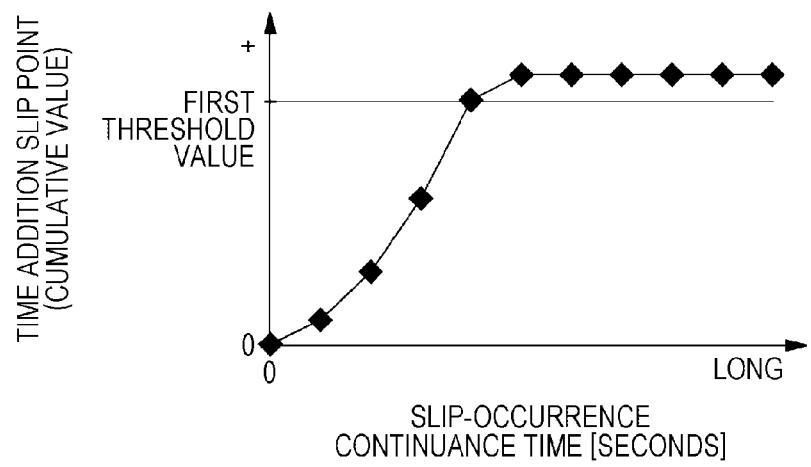
FIG. 11 is a diagram illustrating a time addition slip point calculation table stored in a slip-occurrence continuance time adding unit according to the embodiment.

Now, FIG. 11 is the time addition slip point calculation table stored in the slip-occurrence continuance time adding unit 682. The horizontal axis in FIG. 11 represents the slip-occurrence continuation time (in seconds), and the vertical axis illustrates the cumulative value of time addition slip points having a positive value. That is to say, discrete and pure time addition slip points for each time are represented by the difference between a cumulative value of time addition slip points at one point in FIG. 11 and a cumulative value of time addition slip points at a point adjacent thereto.

The time addition slip point calculation table in FIG. 11 is set such that the longer the slip-occurrence continuation time is, the greater the time addition slip point is, until the cumulative value of time addition slip points exceeds the drive state switching threshold value. This is because if the slip-occurrence continuation time is too short, there is a possibility that the slip determination may have been erroneous. Accordingly, the time addition slip point is set smaller, thereby avoiding a situation where the drive state is needlessly switched to AWD even though the friction coefficient of the road surface is high.

Note that a time addition slip point is set in accordance with the slip-occurrence continuation time, so as to be within the AWD request response time. Further, after the cumulative value of the time addition slip points has exceeded the drive state switching threshold value or predetermined value, time addition slip points that are approximately 0 are continuously calculated in this arrangement, so that the cumulative value of time addition slip points is set to be constant. The reason is that if the cumulative value of time addition slip points greatly exceeds the drive state switching threshold value, the AWD continuation time will continue too long, and as a result drive efficiency (fuel consumption and electricity consumption) will suffer.

Next, the subtraction slip point calculation processing relating to the present embodiment, executed in step S5 in FIG. 7, will be described. In the subtraction slip point calculation processing according to the present embodiment, the subtraction slip points are calculated by drive force subtraction slip point calculation processing, time subtraction slip point calculation processing, lateral G subtraction slip point subtraction slip point calculation processing, and vehicle speed subtraction slip point calculation processing, and thereafter processing is executed to total the calculated subtraction slip points.

Figure 12:
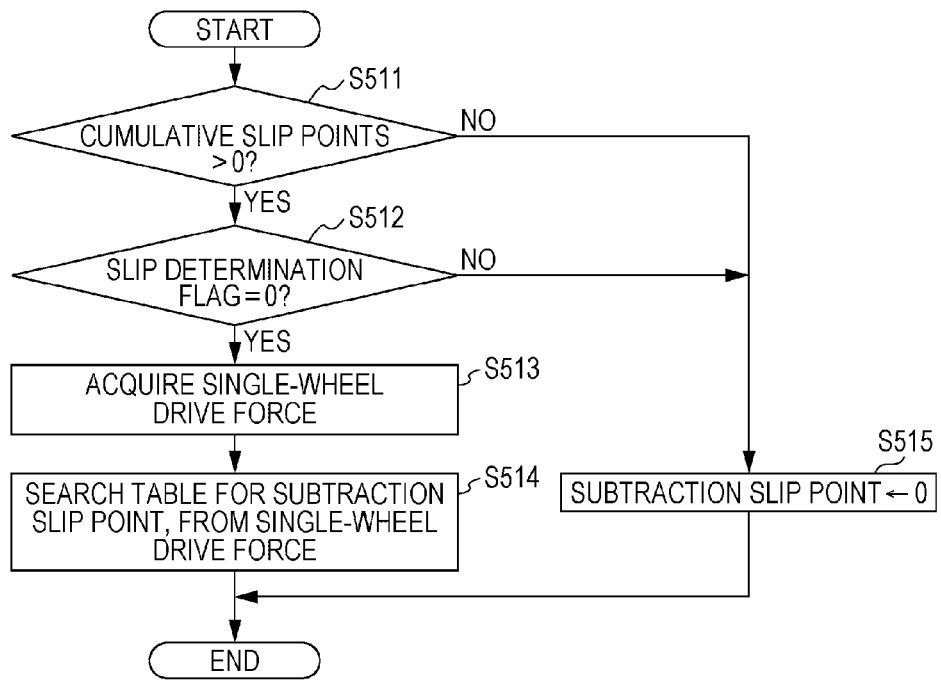
FIG. 12 is a flowchart illustrating procedures of drive force subtraction slip point calculation processing according to the embodiment.

FIG. 12 is a flowchart illustrating procedures of drive force subtraction slip point calculation processing according to the present embodiment. In step S511, differentiation is made regarding whether or not the cumulative slip point is larger than 0. In a case where this differentiation yields YES, meaning that cumulative slip points are accumulated, the flow advances to step S512. In a case where this differentiation yields NO, meaning that cumulative slip points are not accumulated the flow advances to step S515 where the subtraction slip point is set to 0, and the flow ends. Accordingly, only 0 is calculated for the subtraction slip point when the cumulative slip point is 0, thereby avoiding a situation where the value of the cumulative slip point is negative.

In step S512, differentiation is made regarding whether or not the slip determination flag is "0". In a case where this differentiation yields YES, the flow advances to step S513 where single-wheel drive force when slippage is not occurring is acquired, and the flow advances to step S514. In a case where this differentiation yields NO, the flow advances to step S515 where the subtraction slip point is set to 0, and the flow ends.

In step S514, a table search is performed for a subtraction slip point from the single-wheel drive force acquired in step S513, and the flow ends. Specifically, the drive force subtraction slip point calculation table, created beforehand and stored in the slip-non-occurrence drive force subtracting unit 691, is searched in accordance with single-wheel drive force when no slippage is occurring, thereby calculating drive force subtraction slip points.

Figure 13:
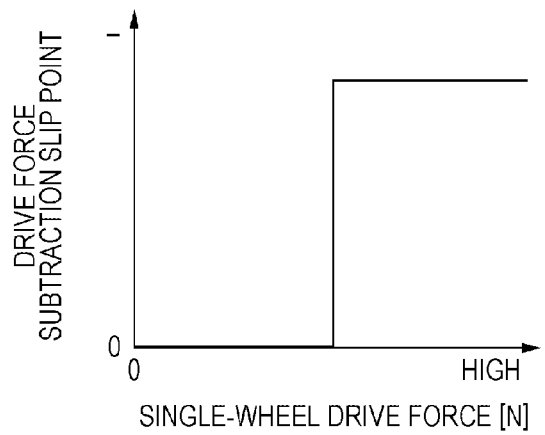
FIG. 13 is a diagram illustrating a drive force subtraction slip point calculation table stored in a slip-non-occurrence drive force subtracting unit according to the embodiment.

Now, FIG. 13 is a diagram illustrating the drive force subtraction slip point calculation table stored in the slip-non-occurrence drive force subtracting unit 691. The horizontal axis in FIG. 13 represents single-wheel drive force N, and the vertical axis represents the drive force subtraction slip point having a negative value. The drive force subtraction slip point calculation table illustrated in FIG. 13 is set such that the drive force subtraction slip point is 0 where the single-wheel drive force where no slipping is occurring is smaller than a predetermined value, and the drive force subtraction slip point is a constant value with a relatively large absolute value at or above the predetermined value. The reason is, that in a case where no slipping is occurring, the higher the single-wheel drive force is, the higher the friction coefficient of the road surface most certainly is, so setting the drive force subtraction slip point to a larger value enables a situation where the drive state is switched to 2WD even though the friction coefficient of the road surface is low to be avoided.

Figure 14:
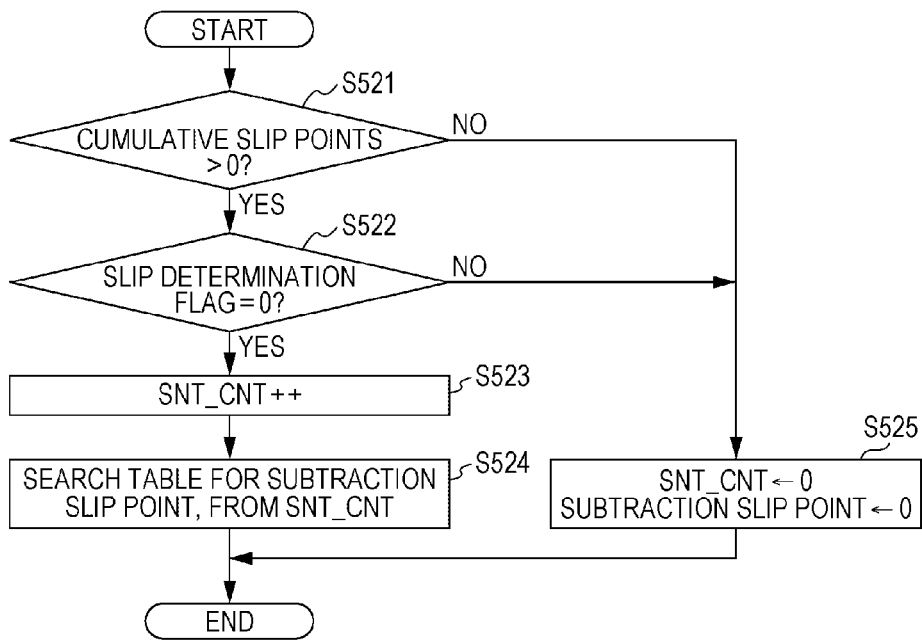
FIG. 14 is a flowchart illustrating procedures of time subtraction slip point calculation processing according to the embodiment.

FIG. 14 is a flowchart illustrating procedures for time subtraction slip point calculation processing according to the present embodiment. In step S521, differentiation is made regarding whether or not the cumulative slip point is larger than 0. In a case where this differentiation yields YES, and there is an accumulation of cumulative slip points, the flow advances to step S522. In a case where this differentiation yields NO and there is no accumulation of cumulative slip points, the flow advances to step S525 where a slip-non-occurrence continuation time counter value SNT_CNT is reset to 0, the subtraction slip point is set to 0, and the flow ends. Accordingly, only 0 is calculated for the subtraction slip point when the cumulative slip point is 0, thereby avoiding a situation where the value of the cumulative slip point is negative.

In step S522, differentiation is made regarding whether or not the slip determination flag is "0". In a case where this differentiation yields YES, the flow advances to step S523 where the slip-non-occurrence continuation time counter value SNT_CNT is incremented, following which the flow advances to step S524. In a case where this differentiation yields NO, the flow advances to step S525 where the slip-non-occurrence continuation time counter value SNT_CNT is reset to 0, the subtraction slip point is set to 0, and the flow ends.

In step S524, a table search is performed for a subtraction slip point, from the slip-non-occurrence continuation time counter value SNT_CNT incremented in step S523, and the flow ends. Specifically, the time subtraction slip point is calculated by searching the time subtraction slip point calculation table created beforehand and stored in the slip-non-occurrence continuance time subtracting unit 692, in accordance with the slip-non-occurrence continuation time counter value SNT_CNT, i.e., the slip-non-occurrence continuation time (in seconds).

Figure 15:
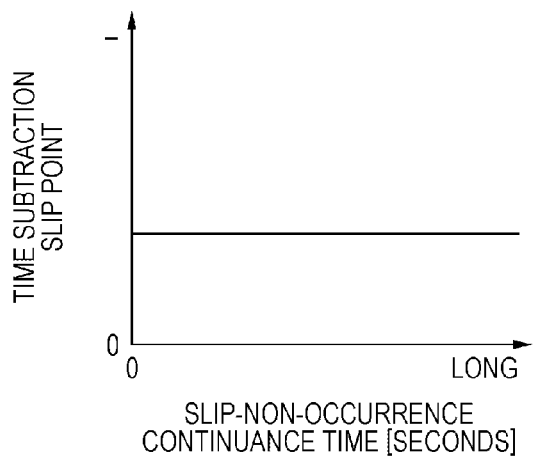
FIG. 15 is a diagram illustrating a time subtraction slip point calculation table stored in a slip-non-occurrence continuance time subtracting unit according to the embodiment.

Now, FIG. 15 is a diagram illustrating the time subtraction slip point calculation table stored in the slip-non-occurrence continuance time subtracting unit 692. The horizontal axis in FIG. 15 represents slip-non-occurrence continuation time (in seconds), and the vertical axis represents time subtraction slip point of a negative value. The time subtraction slip point calculation table illustrated in FIG. 15 is set so that the time subtraction slip point is constant and has a relatively small absolute value, regardless of the slip-non-occurrence continuation time. This is to gradually reduce the cumulative slip points over the slip-non-occurrence continuation time.

Figure 16:
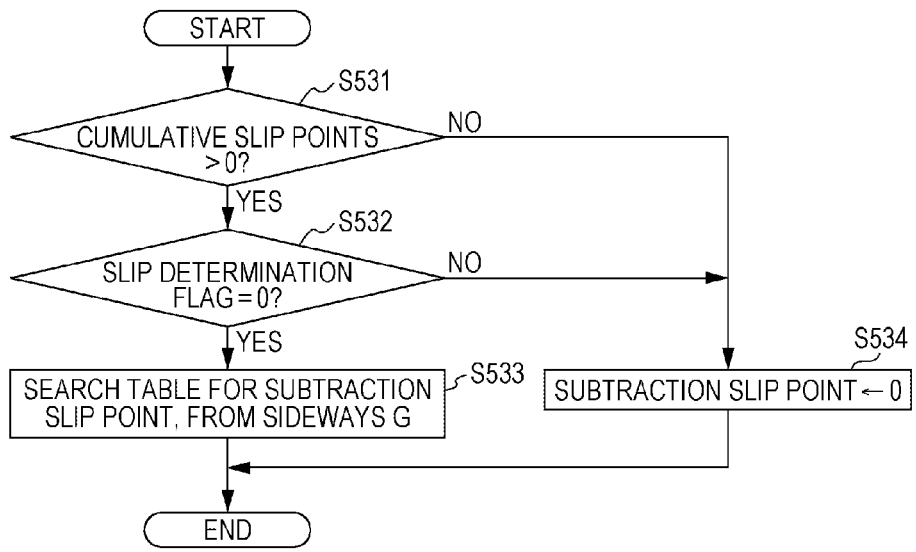
FIG. 16 is a flowchart illustrating procedures of lateral G subtraction slip point calculation processing according to the embodiment.

FIG. 16 is a flowchart illustrating procedures for lateral G subtraction slip point calculation processing according to the present embodiment. In step S531, differentiation is made regarding whether the cumulative slip point is larger than 0. In a case where this differentiation yields YES, meaning that cumulative slip points are accumulated, the flow advances to step S532. In a case where this differentiation yields NO, meaning that cumulative slip points are not accumulated, the flow advances to step S534 where the subtraction slip point is set to 0, and the flow ends. Accordingly, only 0 is calculated for the subtraction slip point when the cumulative slip point is 0, thereby avoiding a situation where the value of the cumulative slip point is negative.

In step S532, differentiation is made regarding whether or not the slip determination flag is "0". In a case where this differentiation yields YES, the flow advances to step S533.

In a case where this differentiation yields NO, the flow advances to step S534 where the subtraction slip point is set to 0, and the flow ends.

In step S533, a table search is performed for a subtraction slip point from the lateral Gs when not slipping, and the flow ends. Specifically, the lateral G subtraction slip point calculation table, created beforehand and stored in the slip-non-occurrence lateral G subtracting unit 693, is searched in accordance with lateral Gs when no slippage is occurring, thereby calculating lateral G subtraction slip points.

Figure 17:
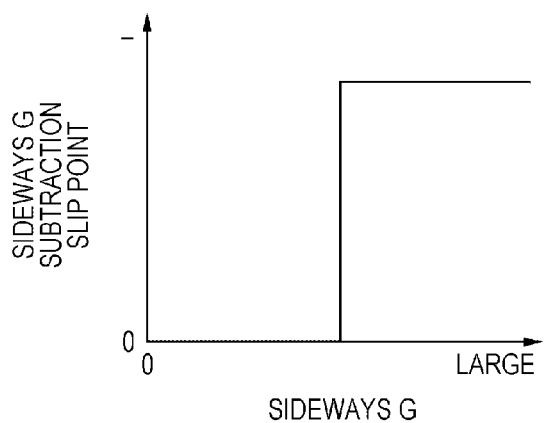
FIG. 17 is a diagram illustrating a lateral G subtraction slip point calculation table stored in a slip-non-occurrence lateral G subtracting unit according to the embodiment.

Now, FIG. 17 is a diagram illustrating the lateral G subtraction slip point calculation table stored in the slip-non-occurrence lateral G subtracting unit 693. The horizontal axis in FIG. 17 represents lateral Gs, and the vertical axis represents the lateral G subtraction slip point having a negative value. The lateral G subtraction slip point calculation table illustrated in FIG. 17 is set such that the lateral G subtraction slip point is 0 where the lateral Gs where no slipping is occurring is smaller than a predetermined value, and the lateral G subtraction slip point is a constant value with a relatively large absolute value at or above the predetermined value. The reason is, that in a case where no slipping is occurring, the greater the lateral Gs are, the higher the friction coefficient of the road surface most certainly is, so setting the lateral G subtraction slip point to a larger value enables a situation where the drive state is switched to 2WD even though the friction coefficient of the road surface is low to be avoided.

Figure 18:
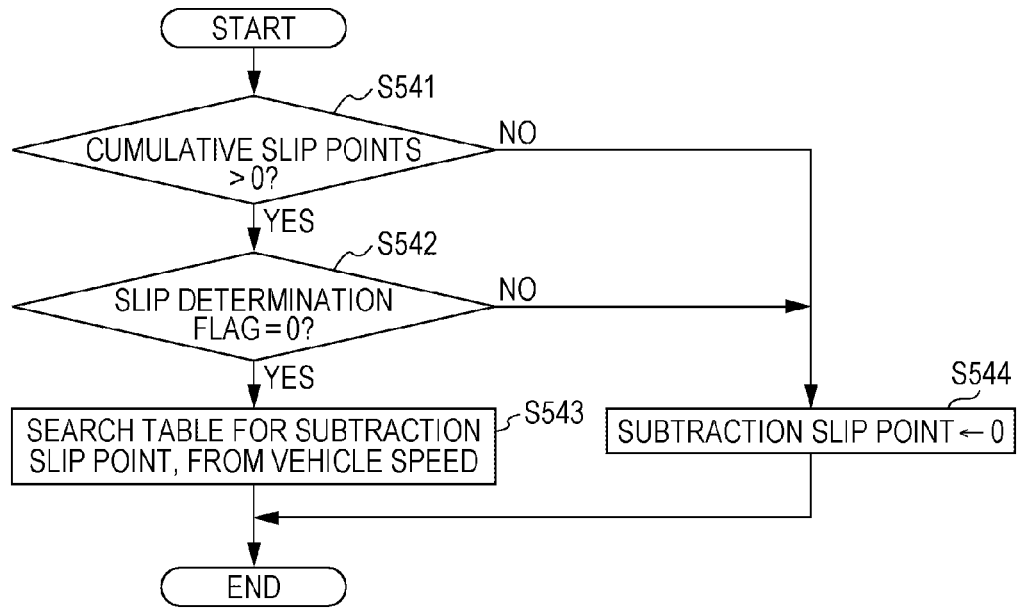
FIG. 18 is a flowchart illustrating procedures of vehicle subtraction slip point calculation processing according to the embodiment.

FIG. 18 is a flowchart illustrating procedures of vehicle speed subtraction slip point calculation processing according to the present embodiment. In step S541, differentiation is made regarding whether the cumulative slip point is larger than 0. In a case where this differentiation yields YES, meaning that cumulative slip points are accumulated, the flow advances to step S542. In a case where this differentiation yields NO, meaning that cumulative slip points are not accumulated, the flow advances to step S544 where the subtraction slip point is set to 0, and the flow ends. Accordingly, only 0 is calculated for the subtraction slip point when the cumulative slip point is 0, thereby avoiding a situation where the value of the cumulative slip point is negative.

In step S542, differentiation is made regarding whether or not the slip determination flag is "0". In a case where this differentiation yields YES, the flow advances to step S543. In a case where this differentiation yields NO, the flow advances to step S544 where the subtraction slip point is set to 0, and the flow ends.

In step S543, a table search is performed for a subtraction slip point from the vehicle speed when not slipping, and the flow ends. Specifically, the vehicle speed subtraction slip point calculation table, created beforehand and stored in the slip-non-occurrence vehicle speed subtracting unit 694, is searched in accordance with vehicle speed when no slippage is occurring, thereby calculating vehicle speed subtraction slip points.

Figure 19:
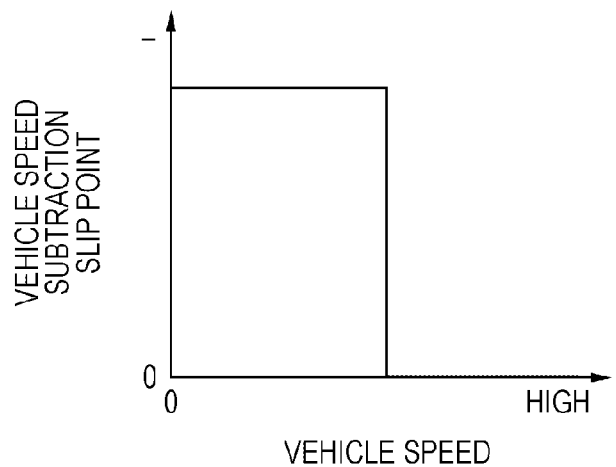
FIG. 19 is a diagram illustrating a vehicle deceleration subtraction slip point calculation table stored in a slip-non-occurrence vehicle speed subtracting unit according to the embodiment.

Now, FIG. 19 is a diagram illustrating the vehicle speed subtraction slip point calculation table stored in the slip-non-occurrence vehicle speed subtracting unit 694. The horizontal axis in FIG. 19 represents vehicle speed, and the vertical axis represents vehicle speed subtraction slip points of a negative value. The vehicle speed subtraction slip point calculation table in FIG. 19 is set such that a constant vehicle speed subtraction slip point that has a relatively large absolute value is obtained if the vehicle speed when no slippage is occurring is smaller than a predetermined value, and for the vehicle speed subtraction slip point to be 0 at or above the predetermined value. The reason for this is as follows. Even if slipping occurs at low vehicle speeds below the predetermined value, the behavior of the vehicle will not be greatly affected, so the vehicle speed subtraction slip point is set to be a constant value with a relatively great absolute value, while the vehicle speed subtraction slip point is set to be 0 at high speeds, thereby realizing switching from AWD to 2WD at a more suitable timing.

Figure 20:
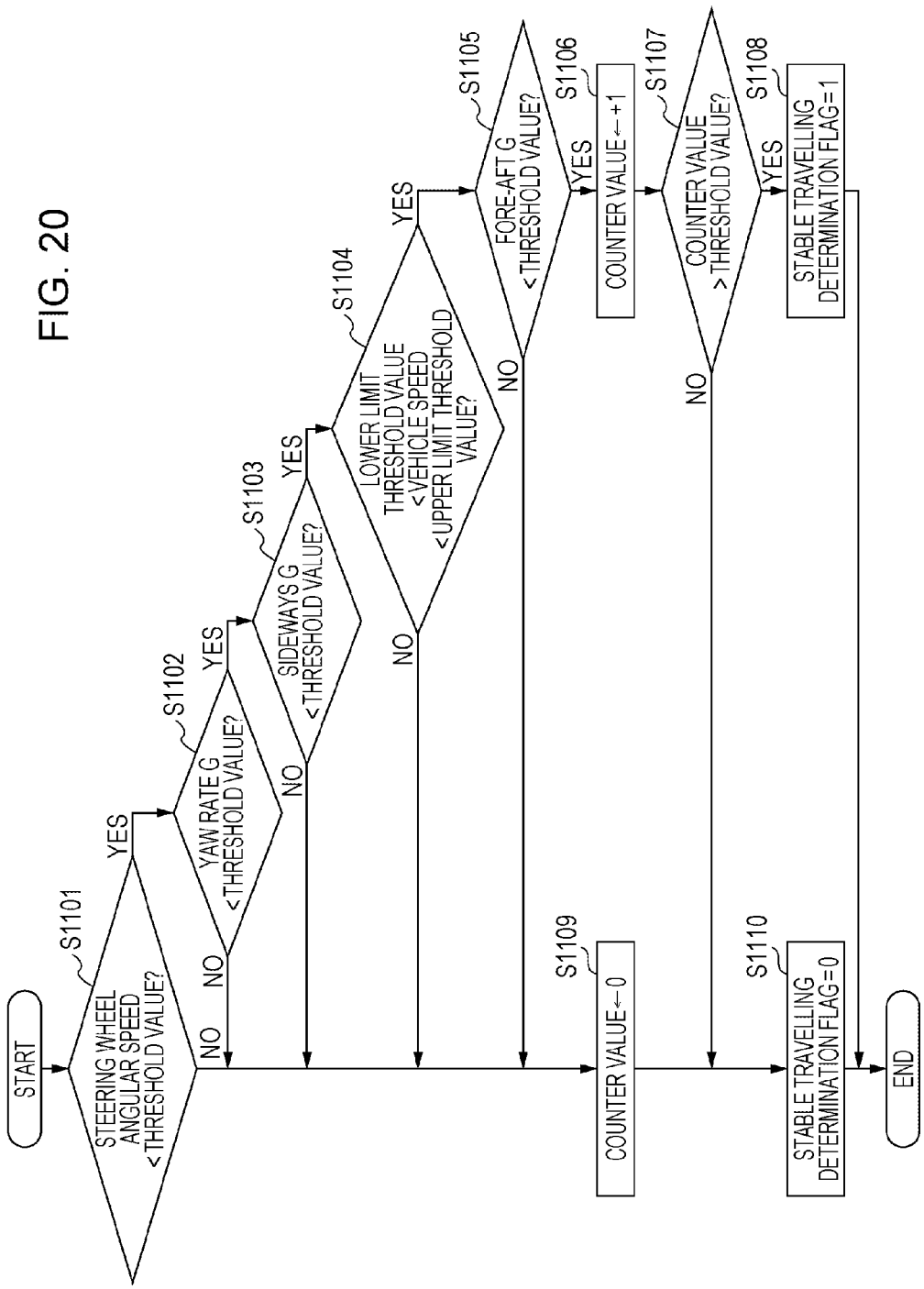
FIG. 20 is a flowchart illustrating procedures of stable traveling determination according to the embodiment.

Next, the stable traveling determination processing according to the present embodiment that is executed in step S11 of FIG. 7 will be described. FIG. 20 is a flowchart illustrating the procedures of stable traveling determination according to the present embodiment.

In step S1101, the ECU 6 performs differentiation regarding whether or not the steering wheel angular speed, calculated by time differentiation of the steering wheel angle by the steering angle sensor 97, is smaller than a threshold value for the steering wheel angular speed. The threshold value of the steering wheel angular speed in the stable traveling determination is set to an appropriate value beforehand, as an index whereby the stable traveling determination flag is set to "1" via the stable traveling determination unit 65. In a case where this differentiation yields YES, the flow advances to step S1102. If NO, the flow advances to step S1109, the counter value is reset to "0", the flow advances to step S1110, where the stable traveling determination flag is set to "0", and thereafter the stable traveling determination processing ends.

In step S1102, the ECU 6 performs differentiation regarding whether or not a yaw rate G calculated by multiplying the yaw rate detected by the yaw rate sensor 98 by the vehicle speed detected by the vehicle speed sensor 96 is smaller than a yaw rate G threshold value. The threshold value for the yaw rate G in the stable traveling determination is set to an appropriate value beforehand, as an index whereby the stable traveling determination flag is set to "1" via the stable traveling determination unit 65. In a case where this differentiation yields YES, the flow advances to step S1103. If NO, the flow advances to step S1109, the counter value is reset to "0", the flow advances to step S1110, where the stable traveling determination flag is reset to "0", and thereafter the stable traveling determination processing ends.

In step S1103, the ECU 6 performs differentiation regarding whether or not the calculated lateral G is smaller than a lateral G threshold value. The lateral G compared with the threshold value is calculated from detection values of the lateral G sensor 95 and so forth. The threshold value for the lateral G in the stable traveling determination is set to an appropriate value beforehand, as an index whereby the stable traveling determination flag is set to "1" via the stable traveling determination unit 65. In a case where this differentiation yields YES, the flow advances to step S1104. If NO, the flow advances to step S1109, the counter value is reset to "0", the flow advances to step S1110, where the stable traveling determination flag is set to "0", and thereafter the stable traveling determination processing ends.

In step S1104, the ECU 6 performs differentiation regarding whether or not the vehicle speed detected by the vehicle speed sensor 96 is larger than a lower limit threshold value for vehicle speed and is smaller than an upper limit vehicle speed threshold value. The upper limit threshold value and lower limit threshold value for the vehicle speed in the stable traveling determination are set to appropriate values beforehand, as indices whereby the stable traveling determination flag is set to "1" via the stable traveling determination unit 65. In a case where this differentiation yields YES, the flow advances to step S1105. If NO, the flow advances to step S1109, the counter value is reset to "0", the flow advances to step S1110, where the stable traveling determination flag is set to "0", and thereafter the stable traveling determination processing ends.

In step S1105, the ECU 6 performs differentiation regarding whether or not the calculated fore-aft G is smaller than a fore-aft G threshold value. The fore-aft G to be compared with the threshold value is calculated from detection values of the fore-aft G sensor 99 and so forth. The threshold value for the fore-aft G in the stable traveling determination is set to an appropriate value beforehand, as an index whereby the stable traveling determination flag is set to "1" via the stable traveling determination unit 65. In a case where this differentiation yields YES, the flow advances to step S1106. If NO, the flow advances to step S1109, the counter value is reset to "0", the flow advances to step S1110, where the stable traveling determination flag is set to "0", and thereafter the stable traveling determination processing ends.

In step S1106, the ECU 6 increments the counter value by 1.

In step S1107, the ECU 6 performs differentiation regarding whether or not the counter value has exceeded a threshold value of the counter value. The threshold value for the counter value in the stable traveling determination is set to an appropriate value beforehand, as an index whereby the stable traveling determination flag is set to "1" via the stable traveling determination unit 65. In a case where this differentiation yields YES, the flow advances to step S1108, where the stable traveling determination flag is set to "1", and thereafter the stable traveling determination processing ends. In the processing in FIG. 20, while the counter value is reset in a case where comparison with the threshold value yields NO, the counter value is incremented by 1 in a case where comparison with all threshold values yields YES. That is to say, the counter value represents how many times a state in which the comparisons with all threshold values yields YES has continued. In other words, the present embodiment uses the counter value as an index showing of the duration of time over which the comparisons with all threshold values yields YES. If NO, the flow advances to step S1110, where the stable traveling determination flag is set to "0", and thereafter the stable traveling determination processing ends.

Figure 21:
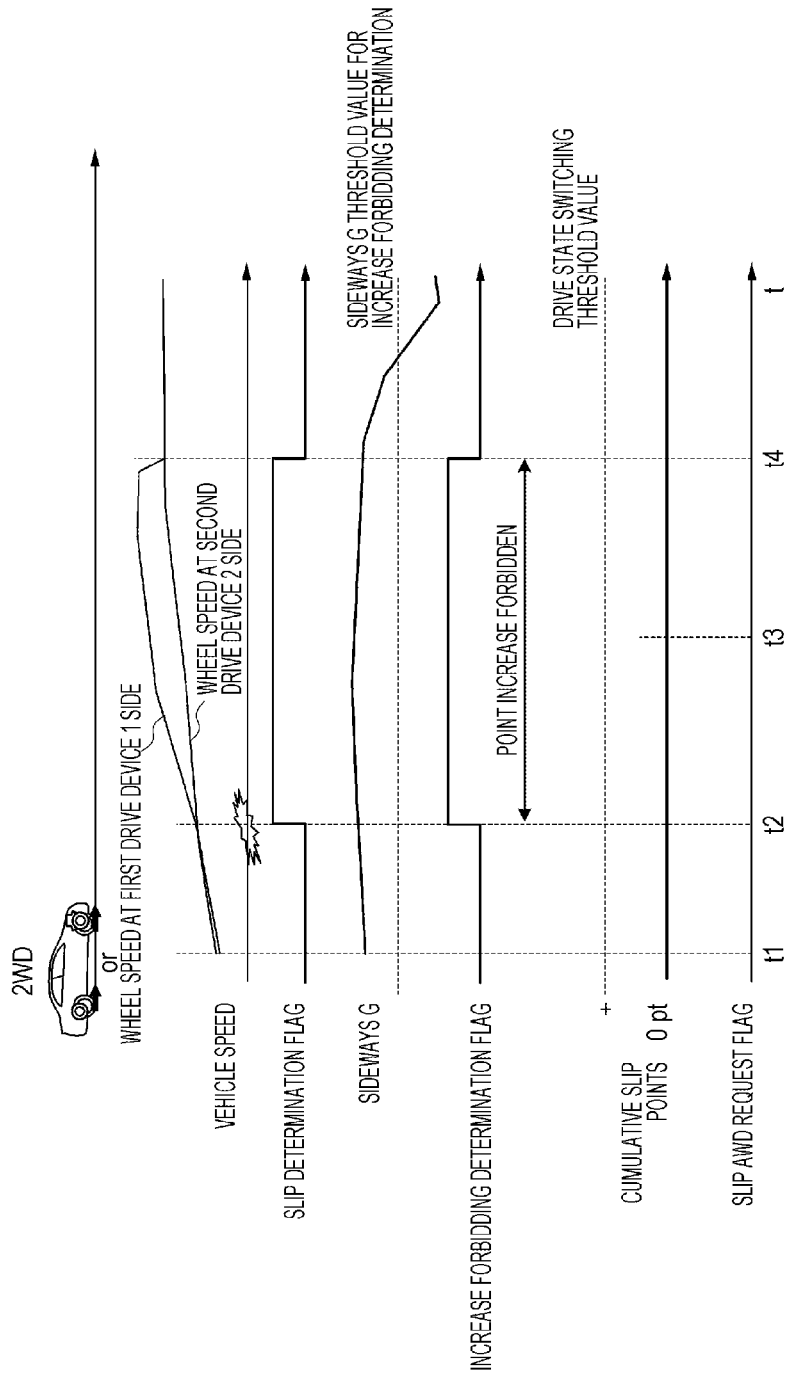
FIG. 21 is a time chart illustrating an example of drive state switching control according to the embodiment.

Next, an example of drive device state switching processing according to the present embodiment, regarding a case of forbidding addition or accumulation of the addition slip points, or increase of the cumulative slip points in particular, will be described. FIG. 21 is a time chart illustrating an example of drive state switching control according to the present embodiment. This example is an example illustrating a state where lateral Gs exceeding the lateral G threshold value in the increase forbidding determination continues to be detected during occurrence of slipping. In FIG. 21, the line graph at the plus side of the "cumulative slip points" item represents the cumulative slip points. Note however, increase of cumulative slip points is forbidden here, so the line graph in FIG. 21 remains at zero.

First, at point-in-time t1 after a 2WD start, wheel speed difference has not occurred between the wheel speeds of the front wheels Wf and rear wheels Wr (RWr, LWr) and not slipping is occurring, so the slip determination flag is set to "0". Accordingly no addition slip points are added to the cumulative slip points. Thus, the slip AWD request flag remains set to "0", so the drive state is not changed, and driving in 2WD continues.

Thereafter, slipping occurs at point-in-time t2, and wheel speed difference occurs between the front wheels Wf and rear wheels Wr (RWr, LWr), so occurrence of slipping is acquired and the slip determination flag is set to "1". Accordingly, increase forbidding determination is performed, but lateral Gs exceeding the lateral G threshold value in the increase forbidding determination are detected, so the increase forbidding determination flag is set to "1". Thus, increase of cumulative slip points is forbidden, and even though the slip determination flag has been set to "1", the cumulative slip points remain at zero at the subsequent point-in-time t3 and thereafter. Accordingly, the slip AWD request flag remains set to "0", so switching of the drive state is not performed, and driving in 2WD continues.

Next, wheel speed difference stops occurring between the front wheels Wf and rear wheels Wr (RWr, LWr) at point-in-time t4, so occurrence of slipping is acquired no more. Accordingly, the increase forbidding determination is not performed any more, so the increase forbidding determination flag is set to "0". The slip determination flag is in a state of having been set to "0", since occurrence of slipping is not acquired to begin with. Thus, slip points are not increased in the cumulative slip points. Thus slip AWD request flag remains set to "0", so the drive state is not switched, and driving in 2WD continues. In this way, forbidding increase of the cumulative slip points based on determination results of the increase forbidding determination unit 66 prevents 2WD from being switched to AWD despite the friction coefficient of the road surface being high and there being no need to use AWD, thereby preventing deterioration of fuel consumption or electricity consumption.

Next, an example of drive device state switching processing according to the present embodiment, regarding a case of forbidding increase of the cumulative slip points in particular, will be described. FIG. 22 is a time chart illustrating an example of drive state switching control according to the present embodiment. This example is an example illustrating a state where the vehicle 3 is slipping, but lateral Gs are increasing. FIG. 22, the bar graphs at the plus side (the upper side in FIG. 22) of the "cumulative slip point" represent addition slip points, the bar graphs at the minus side (the lower side in FIG. 22) represent subtraction slip points, and the line graph represents the cumulative slip points.

First, at point-in-time t1 after a 2WD start, wheel speed difference has not occurred between the wheel speeds of the front wheels Wf and rear wheels Wr (RWr, LWr) and no slipping is occurring, so the slip determination flag is set to "0". Accordingly no addition slip points are added to the cumulative slip points. Thus, the slip AWD request flag remains set to "0", so the drive state is not changed, and driving in 2WD continues.

Thereafter, slipping occurs at point-in-time t2, and wheel speed difference occurs between the front wheels Wf and rear wheels Wr (RWr, LWr), so occurrence of slipping is acquired and the slip determination flag is set to "1". Accordingly, increase forbidding determination is performed, and lateral Gs exceeding the lateral G threshold value in the increase forbidding determination are not detected, so the increase forbidding determination flag is set to "0". This means that increase of cumulative slip points is not forbidden but permitted, so addition slip points are calculated, and the calculated addition slip points are added to the cumulative slip points. Thus, the cumulative slip points are at the drive state switching threshold value or above in point-in-time t3, the slip AWD request flag is accordingly set to "1", and switching to AWD is realized.

Increase in cumulative slip points and increase forbidding determination continues, but at point-in-time t4 lateral Gs exceeding the lateral G threshold value in the increase forbidding determination are detected, so the increase forbidding determination flag is set to "1". Accordingly, increase in cumulative slip points is in a forbidden state, and even if the slip determination flag remains set to "1", increase of cumulative slip points is not performed. Therefore no more increase of cumulative slip points is performed.

Next, wheel speed difference stops occurring between the front wheels Wf and rear wheels Wr (RWr, LWr) at point-in-time t5, so occurrence of slipping is acquired no more. Accordingly, the increase forbidding determination is not performed any more, so the increase forbidding determination flag is set to "0". The slip determination flag is set to "0", since occurrence of slipping is not acquired. Thus, slip points are not increased in the cumulative slip points, but are subtracted by subtraction slip points.

Thereafter, the cumulative slip points drop in value as time passes, and at point-in-time t6 the cumulative slip points fall below the drive state switching threshold value. Accordingly, stable travel determination starts.

At point-in-time t7, in accordance with the stable traveling determination flag having been set to "1", the slip AWD request flag is set to "0". Accordingly, switching from AWD to 2WD is performed. Note that the cumulative slip points continue to fall in value over time, and at point-in-time t8 the cumulative slip points reach zero.

Thus, even in a case where the drive state has already been switched to AWD at the point where the increase forbidding determination flag is set to "1", addition or accumulation of the addition slip points, or increase of the cumulative slip points is forbidden, thereby preventing cumulative slip points from being accumulated, enabling prompt switching from AWD to 2WD. If this arrangement according to the present embodiment is not implemented, and the addition or accumulation of the addition slip points, or increase of the cumulative slip points is not forbidden, the cumulative slip points at point-in-time t5 would be an even greater values, taking even more time until the cumulative slip points fall below the drive state switching threshold value. This would take more time in switching from AWD to 2WD, so it can be clearly seen that the present embodiment facilitates prompt switching from AWD to 2WD.

The present embodiment yields the following advantages. According to the present embodiment, addition slip points are calculated based on the slip acquisition unit having acquired that an excessive slip has occurred. Switching is performed between 2WD and AWD based on cumulative slip points that are the accumulated value of the calculated addition slip points.

In a case of performing such switching in the present disclosure, determination is made regarding whether or not addition or accumulation of the addition slip points, or increase of the cumulative slip points, is to be forbidden, or not to be forbidden but permitted, based on the lateral acceleration correlation value that has correlation with lateral acceleration of the vehicle.

With regard to this point, if lateral acceleration correlation values of lateral Gs or the like are high, there is a high likelihood that the friction coefficient is high such as the road being paved, the road surface being dry, or the like. In such a case for example, if the driver performs steering operations such that the steering angle suddenly changes on a road surface with a high friction coefficient such as a dry road or the like, difference will occur between the wheel speed of the front wheels and the wheel speed of the rear wheels. However, this is the result of intentional operations by the driver, and the vehicle is not in an inoperable state. Accordingly, even if there is difference in the wheel speed of the front wheels and the wheel speed of the rear wheels, there is not always a need to switch to AWD. In such a case, addition or accumulation of the addition slip points, or increase of the cumulative slip points, is forbidden in the present embodiment. This prevents a vehicle traveling in 2WD from switching from 2WD to AWD. Accordingly, switching to AWD even though the road surface has a high friction coefficient and AWD is unnecessary can be prevented, thereby improving drive efficiency.

On the other hand, if lateral acceleration correlation values such as lateral Gs or drive force correlation values such as four-wheel drive force are low, there is a high likelihood that slipping is occurring with road conditions of low friction coefficient such as wet pavement, frozen road conditions, or the like. Accordingly, addition or accumulation of the addition slip points, or increase of the cumulative slip points, is not forbidden in the present embodiment, so the drive state can be switched from 2WD to AWD in accordance with the drive force of a drive wheel where slipping has occurred, so vehicle stability can be secured in a case where the road surface has a low friction coefficient and AWD is necessary.

Also, in a case where the vehicle is already traveling in AWD at the point of determining to forbid addition or accumulation of the addition slip points, or increase of the cumulative slip points, based on the lateral G that is a lateral acceleration threshold value having correlation with lateral acceleration of the vehicle, addition or accumulation of the addition slip points, or increase of the cumulative slip points is forbidden. Thus, forbidding addition or accumulation of the addition slip points, or increase of the cumulative slip points, even if the drive state has already switched to AWD, prevents excessive accumulation of cumulative slip points, thus facilitating prompt switching from AWD to 2WD after slipping. Accordingly, a situation where AWD is needlessly continued for a long time even though the friction coefficient of the road is high and AWD is unnecessary, can be suppressed, thereby improving drive efficiency.

Also, in a case where the vehicle is already traveling in AWD at the point of determining not to forbid but to permit addition or accumulation of the addition slip points, or increase of the cumulative slip points, based on the lateral G that is a lateral acceleration threshold value having correlation with lateral acceleration of the vehicle, addition of addition slip points is performed. Thus, addition or accumulation of the addition slip points, or increase of the cumulative slip points is permitted even if the drive state has already switched to AWD, so cumulative slip points are accumulated, thereby preventing immediate switching from AWD to 2WD after the slipping ends. Accordingly, in a case of slipping on a road surface in a low friction coefficient state, such as in wet or frozen road conditions, traveling in AWD is continued, thereby enabling vehicle stability to be secured.

Subtraction slip points are calculated in a time-discrete manner, based on the slip acquisition unit having not acquired that an excessive slip has occurred, and subtraction slip points are accumulated in addition to addition slip points. Accordingly, in a case where the cumulative slip points exceed the drive state switching threshold value and thereafter are smaller than drive state switching threshold value, the drive state is switched to 2WD. Thus, traveling continues in AWD until configuration can be made that the excessive slipping has ended. In an arrangement where elapse of a certain amount of time from an excessive slip having occurred triggers switching from AWD to 2WD, the drive state is switched from AWD to 2WD even if in the middle of an excessive slip, but occurrence of such problems can be avoided by the present embodiment.

Note that the present disclosure is not restricted to the above embodiment, and that modifications, improvements, and so forth within the range of the present disclosure are encompassed by the present disclosure. For example, the addition/subtraction slip point calculating unit 62 in the above embodiment may be replaced by an addition slip point calculating unit that does not calculate subtraction slip points and only calculates addition slip points. In this case, switching from 2WD to AWD is performed based on the cumulative slip points that are the cumulative value of the addition slip points, while switching from AWD to 2WD may be performed when a predetermined amount of time elapses, for example, regardless of points.

Although the drive source from the rear wheels has been described as being only the electric motors 2A and 2B in the above embodiment, the rear wheels may be driven by an internal combustion engine. Further, although the second drive device 2 for the rear wheels has been described as being two motors in the above embodiment, the electric motors 2A and 2B, one motor may be used instead.

It is sufficient to have a configuration where addition or accumulation of the addition slip points, or increase of the cumulative slip points is forbidden in a case where the increase forbidding determination flag is "1", and although the addition slip point calculating unit 68 calculates drive force correlation values and addition slip points based on the slip-occurrence continuation time in this case for example, an arrangement may be made where the calculated addition slip points are not accumulated in the cumulative slip points at the cumulative slip point calculating unit 63.

What is claimed is:

1. A vehicle drive system comprising:
    a first drive device configured to drive a first drive wheel, which is either a front wheel or a rear wheel of a vehicle;
    a second drive device configured to drive a second drive wheel, which is the other of the front wheel or the rear wheel of the vehicle; and
    a control device configured to control the first drive device and the second drive device and to control a drive state of the first drive wheel and the second drive wheel,
    wherein the control device comprises
        a slip acquisition unit configured to acquire that an excessive slip, which is slipping of the first drive wheel or the second drive wheel by a predetermined amount or more, is occurring,
        an addition slip point calculating unit configured to calculate addition slip points in a time-discrete manner, based on the slip acquisition unit having acquired that the excessive slip has occurred,
        a cumulative slip point calculating unit configured to accumulate the addition slip points and calculate a cumulative slip point over time,
        a drive state switching unit configured to realize an in part-wheel drive state where the vehicle is driven by only one of the first drive wheel and the second drive wheel in a case where the cumulative slip point is smaller than a predetermined drive state switching threshold value, and to realize an all-wheel drive state where the vehicle is driven by both the first drive wheel and the second drive wheel in a case where the cumulative slip point is equal to or greater than the drive state switching threshold value, and
        an increase forbidding determination unit configured to forbid at least one of: the addition of the addition slip points; the accumulation of the addition slip points; and increase of the cumulative slip points, in a case where a lateral acceleration correlation value that has correlation with a lateral acceleration of the vehicle exceeds a predetermined lateral acceleration threshold value.

2. The vehicle drive system according to claim 1, wherein the control device causes the forbidding determination unit to forbid said at least one of the addition of the addition slip points, the accumulation of the addition slip points, and the increase of the cumulative slip points, in a case where the lateral acceleration correlation value exceeds the lateral acceleration threshold value in the in part-wheel drive state.

3. The vehicle drive system according to claim 1, wherein the control unit further comprises a determining unit that, in a case where the cumulative slip point is smaller than the drive state switching threshold value in the all-wheel drive state, determines whether or not conditions for the drive state switching unit to realize the in part-wheel drive state have been satisfied, and
wherein, in a case where the cumulative slip point is smaller than the drive state switching threshold value and also the conditions to realize the in part-wheel drive state have been satisfied, the drive state switching unit realizes the in part-wheel drive state.

4. The vehicle drive system according to claim 1, wherein the control unit further comprises a subtraction slip point calculating unit configured to calculate subtraction slip points in a time-discrete manner, based on the slip acquisition unit having not acquired that an excessive slip has occurred, and
wherein the cumulative slip point calculating unit accumulates the subtraction slip points in addition to the addition slip points.

* * * * *